US008582834B2

(12) United States Patent
Tong et al.

(10) Patent No.: US 8,582,834 B2
(45) Date of Patent: Nov. 12, 2013

(54) MULTI-IMAGE FACE-BASED IMAGE PROCESSING

(75) Inventors: Xin Tong, Sunnyvale, CA (US); Adriana Dumitras, Santa Clara, CA (US); Andrew Bryant, Los Gatos, CA (US); Olivier Fedkiw, San Francisco, CA (US); Daniel Pettigrew, Pacific Palisades, CA (US); Peter Warner, Paris (FR)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 13/221,888

(22) Filed: Aug. 30, 2011

(65) Prior Publication Data

US 2012/0051658 A1    Mar. 1, 2012

Related U.S. Application Data

(60) Provisional application No. 61/378,384, filed on Aug. 30, 2010.

(51) Int. Cl.
*G06K 9/00*    (2006.01)

(52) U.S. Cl.
USPC .......................................... 382/118; 382/224

(58) Field of Classification Search
None
See application file for complete search history.

(56) References Cited

U.S. PATENT DOCUMENTS

| | | | |
|---|---|---|---|
| 5,313,275 A | 5/1994 | Daly et al. | |
| 5,682,326 A | 10/1997 | Klingler et al. | |
| 6,118,455 A | 9/2000 | Hidaka et al. | |
| 6,154,601 A | 11/2000 | Yaegashi et al. | |
| 6,362,829 B1 | 3/2002 | Omvik et al. | |
| 6,477,271 B1 | 11/2002 | Cooper et al. | |
| 6,731,800 B1 | 5/2004 | Barthel et al. | |
| 6,741,755 B1 | 5/2004 | Blake et al. | |
| 6,763,134 B2 | 7/2004 | Cooper et al. | |

(Continued)

FOREIGN PATENT DOCUMENTS

| | | |
|---|---|---|
| EP | 0863671 | 9/1998 |
| EP | 2431942 | 3/2012 |

(Continued)

OTHER PUBLICATIONS

U.S. Appl. No. 13/607,586, filed Sep. 7, 2012, Pettigrew, Daniel, et al.

(Continued)

*Primary Examiner* — Samir Ahmed
*Assistant Examiner* — Siamak Harandi
(74) *Attorney, Agent, or Firm* — Adeli & Tollen LLP

(57) ABSTRACT

Some embodiments provide a method for detecting and/or identifying a set of faces in a video frame and performing a set of image processing operations based on locations of the set of faces. In particular, the method identifies a set of respective locations of the set of faces in the video frame and applies one or more image processing operations based on the locations of the set of faces found in the video frame. The image processing operations include color correction operations, non-color correction operations, and image processing operations that modify areas inside or outside of the detected and/or identified faces. Additionally, some embodiments provide a graphical user interface for automatically applying image processing operations to an area of a video frame isolated by an ellipse-shaped mask. Furthermore, some embodiments provide a system for automatically applying image processing operations to an area of a video frame isolated by an ellipse-shaped mask.

35 Claims, 24 Drawing Sheets

(56) References Cited

U.S. PATENT DOCUMENTS

| | | | |
|---|---|---|---|
| 6,765,608 | B1 | 7/2004 | Himeda et al. |
| 6,870,945 | B2 | 3/2005 | Schoepflin et al. |
| 7,003,135 | B2* | 2/2006 | Hsieh et al. .................. 382/103 |
| 7,080,065 | B1 | 7/2006 | Kothuri et al. |
| 7,325,199 | B1 | 1/2008 | Reid |
| 7,403,568 | B2 | 7/2008 | Dumitras et al. |
| 7,430,335 | B2 | 9/2008 | Dumitras et al. |
| 7,602,991 | B2 | 10/2009 | Kokemohr |
| 7,693,341 | B2 | 4/2010 | Pettigrew et al. |
| 7,702,149 | B2 | 4/2010 | Ohkubo et al. |
| 7,809,207 | B2 | 10/2010 | Dumitras et al. |
| 7,986,355 | B2 | 7/2011 | Nozawa |
| 8,208,565 | B2 | 6/2012 | Dumitras et al. |
| 8,280,171 | B2 | 10/2012 | Pettigrew et al. |
| 8,331,685 | B2 | 12/2012 | Pettigrew et al. |
| 2003/0002715 | A1 | 1/2003 | Kowald |
| 2003/0053685 | A1 | 3/2003 | Lestideau |
| 2003/0068087 | A1 | 4/2003 | Wu et al. |
| 2004/0120554 | A1 | 6/2004 | Lin et al. |
| 2005/0216841 | A1 | 9/2005 | Acker et al. |
| 2005/0238217 | A1 | 10/2005 | Enomoto et al. |
| 2005/0271273 | A1 | 12/2005 | Blake et al. |
| 2006/0115185 | A1 | 6/2006 | Iida et al. |
| 2006/0126719 | A1 | 6/2006 | Wilensky |
| 2006/0204034 | A1 | 9/2006 | Steinberg et al. |
| 2006/0233245 | A1 | 10/2006 | Chou et al. |
| 2007/0013813 | A1 | 1/2007 | Sun et al. |
| 2007/0165966 | A1 | 7/2007 | Weiss et al. |
| 2007/0189627 | A1* | 8/2007 | Cohen et al. .................. 382/254 |
| 2007/0263119 | A1 | 11/2007 | Shum et al. |
| 2008/0117333 | A1 | 5/2008 | Walsh |
| 2008/0284904 | A1 | 11/2008 | Dumitras et al. |
| 2008/0292201 | A1* | 11/2008 | Dumitras et al. ............. 382/260 |
| 2009/0169066 | A1 | 7/2009 | Yang et al. |
| 2009/0179998 | A1* | 7/2009 | Steinberg et al. .......... 348/222.1 |
| 2009/0220149 | A1 | 9/2009 | Menadeva et al. |
| 2009/0297031 | A1 | 12/2009 | Pettigrew et al. |
| 2009/0297035 | A1 | 12/2009 | Pettigrew et al. |
| 2010/0026831 | A1 | 2/2010 | Ciuc et al. |
| 2010/0054549 | A1 | 3/2010 | Steinberg et al. |
| 2011/0185297 | A1 | 7/2011 | Reid et al. |
| 2012/0206475 | A1 | 8/2012 | Bryant et al. |
| 2012/0206479 | A1 | 8/2012 | Bryant et al. |
| 2012/0210229 | A1 | 8/2012 | Bryant et al. |
| 2012/0210274 | A1 | 8/2012 | Pettigrew et al. |

FOREIGN PATENT DOCUMENTS

| | | |
|---|---|---|
| EP | 2458552 | 5/2012 |
| EP | 2458560 | 5/2012 |
| EP | 2286384 | 6/2012 |
| GB | 2312120 | 10/1997 |
| WO | WO 01/26050 | 4/2001 |
| WO | WO 2005/020584 | 3/2005 |
| WO | WO 2009/146296 | 12/2009 |
| WO | WO 2009/154951 | 12/2009 |
| WO | PCT/US2012/025525 | 2/2012 |
| WO | WO 2012/030869 | 3/2012 |

OTHER PUBLICATIONS

U.S. Appl. No. 13/683,991, filed Nov. 21, 2012, Pettigrew, Daniel, et al.

International Search Report and Written Opinion for PCT/US2004/017415, Jan. 28, 2005 (mailing date), Apple Inc.

International Preliminary Report on Patentability for PCT/US2004/017415, Feb. 13, 2006 (issuance date), Apple Inc.

International Preliminary Report on Patentability for PCT/US2009/045094, Nov. 30, 2010 (issuance date), Apple Inc.

International Search Report and Written Opinion for PCT/US2009/045094, Jan. 28, 2010 (mailing date), Apple Inc.

Invitation to Pay Fee's and Partial Search Report for PCT/US2009/045094, Nov. 25, 2009 (mailing date), Apple Inc.

Portions of prosecution history of EP09767263, Jun. 1, 2012 (mail date), Apple Inc.

Portions of prosecution history of EP11188901, Feb. 12, 2013 (mailing date), Apple Inc.

Portions of prosecution history of EP12156769, Jan. 29, 2013 (mailing date), Apple Inc.

Portions of prosecution history of EP12156770, Jan. 29, 2013 (mailing date), Apple Inc.

International Preliminary Report on Patentability and Written Opinion for PCT/US2011/049801, Mar. 5, 2013 (issuance date), Apple Inc.

International Search Report for PCT/2011/049801, May 16, 2012 (mailing date), Apple Inc.

Invitation to Pay Fee's and Partial Search Report for PCT/US2011/049801, Dec. 12, 2011 (mailing date), Apple Inc.

Invitation to Pay Fee's and Partial Search Report for PCT/US2012/025525, Jun. 14, 2012 (mailing date), Apple Inc.

Author Unknown, "Apple Aperture 3," http://www.apple.com/aperture/what-is-html, Month Unknown, 2007, pp. 1-7, Google.

Author Unknown, "Apple Announces Final Cut Pro 4," NAB, Apr. 6, 2003, 3 pages, Apple Inc., Las Vegas, NV, USA.

Author Unknown, "Using Adobe Premiere Elements 8 Editor", last updated Aug. 12, 2010, 313 pages, Adobe Systems Incorporated, San Jose, California, USA.

Author Unknown, "Using Adobe Flash CS4 Professional," updated Mar. 5, 2009, 474 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "Adobe Premiere Pro CS3: Classroom in a Book", Month Unknown, 2008, 27 pages, Chapters 9 and 10, Adobe Systems Incorporated, San Jose, California, USA.

Author Unknown, "iMovie '08 Getting Started," Month Unknown, 2008, pp. 1-50, Apple Inc., USA.

Bai, Xue, et al., "A Geodesic Framework for Fast Interactive Image and Video Segmentation and Matting," Dec. 26, 2007, 8 pages, IEEE Xplore.

Brenneis, Lisa, "Final Cut Pro 3 for Macintosh: Visual QuickPro Guide," Apr. 2002, 288 pages, Peachpit Press, Berkeley, California, USA.

Dawood, Mohammad, et al., "Reliable Dual-Band Based Contour Detection: A Double Dynamic Programming Approach," ICIAR 2004, Sep. 29, 2004, pp. 544-551, Springer-Verlag, Berlin Heidelberg.

Dumitras, Adriana, et al., "An Automatic Method for Unequal and Omni-Directional Anisotropic Diffusion Filtering of Video Sequences," Proceedings of IEEE International Conference on Acoustics, Speech and Signal Processing, May 17, 2004, pp. 317-320, Montreal, Canada.

Li, Yin, et al., "Lazy Snapping," ACM Transactions on Graphics, Jan. 2004, pp. 303-308, vol. 23, No. 3, ACM, NY, USA.

Liang, Jianming, et al., "United Snakes," The Proceedings of the Seventh IEEE International Conference, Computer Vision 1999, Sep. 20, 1999, pp. 933-940, IEEE Computer Society, Kerkyra, Greece.

McInerney, Tim, "SketchSnakes: Sketch-line initialized Snakes for efficient interactive medical image segmentation," Month Unknown, 2008, pp. 331-352, ScienceDirect, available online at www.sciencedirect.com.

Mortensen, Eric N, et al., "Interactive Segmentation with Intelligent Scissors," Graphical Models and Image Processing, Sep. 1998, pp. 349-384, Academic Press, Duluth, MA, USA.

Myers, Brad A., et al., "A Multi-View Intelligent Editor for Digital Video Libraries," The First ACM+IEEE Joint Conference on Digital Libraries (JCDL'01), Jun. 24-28, 2001, 10 pages, Roanoke, Virginia, USA.

(56) References Cited

OTHER PUBLICATIONS

Orzan, Alexandrina, et al., "Diffusion Curves: A Vector Representation for Smooth-Shaded Images," Proceeding SIGGRAPH '08, Month Unknown, 2008, 8 pages.

Orzan, Alexandrina, et al., "Diffusion Curves: A Vector Representation for Smooth-Shaded Images," Screenshots of Online Video, Proceeding SIGGRAPH '08, Month Unknown, 2008, 3 pages, available online at http://artis.imag.fr/Publications/2008/OBWBTS08/.

Perona, P., "Anisotropic Diffusion Processes in Early Vision," Proceedings of the IEEE Multidimensional Signal Processing Workshop, Month Unknown, 1989, p. 68, Pacific Grove, CA, USA.

Rother, Carsten, et al., "GrabCut—Interactive Foreground Extraction using Graph Cuts," Proceedings of the ACM SIGGRAPH, Month Unknown, 2004, pp. 309-314, ACM, New York, USA.

Tsuji, Hiroyuki, et al., "A Nonlinear Spatio-Temporal Diffusion and Its Application to Prefiltering in MPEG-4 Video Coding," Proceedings of the International Conference on Image Processing, Sep. 2002, pp. I-85-I-88, IEEE, New York, NY, USA.

You, J., et al., "A Robust and Real-Time Texture Analysis System Using a Distributed Workstation Cluster," Proceedings of International Conference on Acoustic, Speech, and Signal Processing, May 1996, pp. 2207-2210, Atlanta, GA, USA.

\* cited by examiner

MULTI-IMAGE FACE-BASED IMAGE PROCESSING

CLAIM OF BENEFIT TO PRIOR APPLICATION

This Application claims the benefit of U.S. Provisional Patent Application 61/378,384, entitled "Multi-Image Face Based Image Processing," filed Aug. 30, 2010.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface that allows designers to digitally manipulate graphical representations of the media content to produce a desired result.

One difficulty in media editing is that a user cannot easily perform facial image processing of the people in video content. For instance, video content that is shot in sub-optimal lighting conditions (e.g., poor or incorrectly lit) can make a face or faces difficult to see. Moreover, in these sub-optimal lighting conditions, the faces can have a color cast that causes the faces to be displayed with an incorrect skin tone or color (e.g., red, blue, green, etc.). Therefore, facial image processing might be necessary to address these issues.

In some instances, focusing on the face of a person is desired in a particular video content. For example, facial editing can be performed to focus the visual attention of the viewer to the face only. In other instances, facial editing is performed to isolate one's face from other people in the video content. Therefore, specific facial image processing can be performed to provide more visual emphasis on the face in video content.

In a typical media editing application, the user is required to manually locate faces in a given video frame, manually select areas of the faces for image processing, and then apply the image processing to these selected areas of the video frame. Consequently, to perform image correction on the faces in an entire media clip, the user must repeatedly perform these steps for each video frame that includes faces. This is a cumbersome task that is time-consuming and error-prone because the positions of faces can vary frame to frame. Similarly, lighting conditions can change from one video frame to a subsequent video frame.

BRIEF SUMMARY

Some embodiments of the invention provide a novel image-processing tool that performs image processing based on the locations of one or more faces in one or more images. For instance, in some embodiments, this tool is used in a media editing application that composites one or more media clips to produce a composite media presentation. A media clip is a graphical representation of a piece of media content that is stored on the computing device on which the media editing application executes, or on a computing device to which the media editing application has access. Examples of such content include picture data, audio data, video data, text data, and/or other media data. The media clips on which the image-processing tool is used include picture or video content that may contain one or more faces of one or more people.

In some embodiments, the image-processing tool of the editing application performs a face-locating technique (e.g., a face detection technique and/or a face recognition technique) on frames of one or more video clips, or of the composite video clip, to detect respective locations of one or more faces in one or more frames. This tool then performs one or more image processing operations based on the locations of the set of faces that it detected in the video content. In some embodiments, the image-processing tool performs the set of image processing operations on several or all video frames of a video content in an automated manner that does not require the user to manually step through each frame to select a face or an operation. For instance, the automatic image processing operation of some embodiments do not require the user to perform any operation other than specifying the type of image processing operation(s) to perform and selecting one or more faces to edit in only a subset of the video frames (i.e., in only some but not all of the video frames that are edited by the image processing operation(s)).

In some embodiments, the image-processing tool automatically selects a set of faces that it detected in one or more frames and tracks the set of faces over different frames in order to perform the set of image processing operations on the detected faces. Alternatively, or conjunctively, the image-processing tool provides for user selection of faces that the tool located in one or more frames and tracks the user-selected faces through different frames in order to perform the same set of image processing operations on the selected faces. The image processing tool of some embodiments also provides for user selection of image processing operations to perform on the automatically or manually selected faces.

In some embodiments, the image-processing tool creates and updates a face registry. The face registry includes an entry for each unique face detected in the frames of an image sequence. Each face registry entry stores information about the unique face. The image-processing tool utilizes the face registry entry for different purposes. For instance, the image-processing tool can filter out areas of frames that are incorrectly detected as faces and thereby improves accuracy of face detection. The image-processing tool may also find inconsistencies (e.g., areas detected as faces only occasionally over a range of frames of the image sequence by using the information stored in the face registry entries). Moreover, the face registry entries may be used to track detected faces over the frames of the image sequence in order to apply image processing operations only on those tracked faces.

In different embodiments, the image-processing tool can perform different sets of image processing operations based on the locations of the set of faces that it detects. Examples of such operations include (1) color correction operations that adjust the color attributes of each detected face (i.e., the color attribute of the pixels that form each face), (2) non-color based corrections that modify the appearance of the faces (such as filter-based image processing operations that add, remove or otherwise modify the pixels that form each detected face), and (3) image processing operations that modify areas in the frame other than the detected faces, etc.

Different embodiments provide different combinations of such image processing operations for the user of the media editing application to choose or accept.

To perform image processing operations on a face or on an area of the frame other than a face, the image-processing tool of some embodiments generates a geometric shape to surround the face. Different embodiments use different types of geometric shapes. Examples of such shapes include circles, ellipses, rectangles, etc. Also, different embodiments utilize different techniques to generate such geometric shapes. For each detected face, some embodiments generate a custom geometric shape that is based on the geometric properties of the detected face.

Moreover, some embodiments use the generated geometric shape for each face to provide a gradual transition for the image processing that is applied to a face or to an area outside of a face. For instance, some embodiments use the geometric shape generated for a face to soften any image processing operation that is applied to the face or to an area outside of the face, in order to smooth the transition between the image processed portion of a frame and the non-processed portion of the frame, or between the image processed portion of a frame and another image processed portion of the frame.

Several of the embodiments described above use face recognition to automatically recognize one or more faces (i.e., recognizing the identities of faces) in one or more frames and automatically process these frames based on the location of the recognized face(s). However, other embodiments simply utilize face detection (i.e., classifying objects as faces) that employs some of the techniques described above. For instance, in some embodiments, the image-processing tool (1) requires the user to step through the frames of the video on a frame by frame basis, (2) utilizes face detection to automatically detect faces in those frames, and (3) for each detected face, generates the above-described geometric shapes to automatically define an isolated region around each face.

One of ordinary skill in the art will understand that not all of the above-described features need to be performed by all embodiments of the invention. For instance, some embodiments might not use a geometric shape generated for each face to smoothen the image processing that is performed based on the location of the face. Also, one of ordinary skill in the art will appreciate that the image-processing tool of some embodiments is used in other applications that do not composite video clips. For instance, in some embodiments, this tool is used in a photo organizing and editing application to perform, in an automated manner, image processing on one or more pictures of the same individual. This tool can also be used in many other types of programs (e.g., operating systems, applications, etc.).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
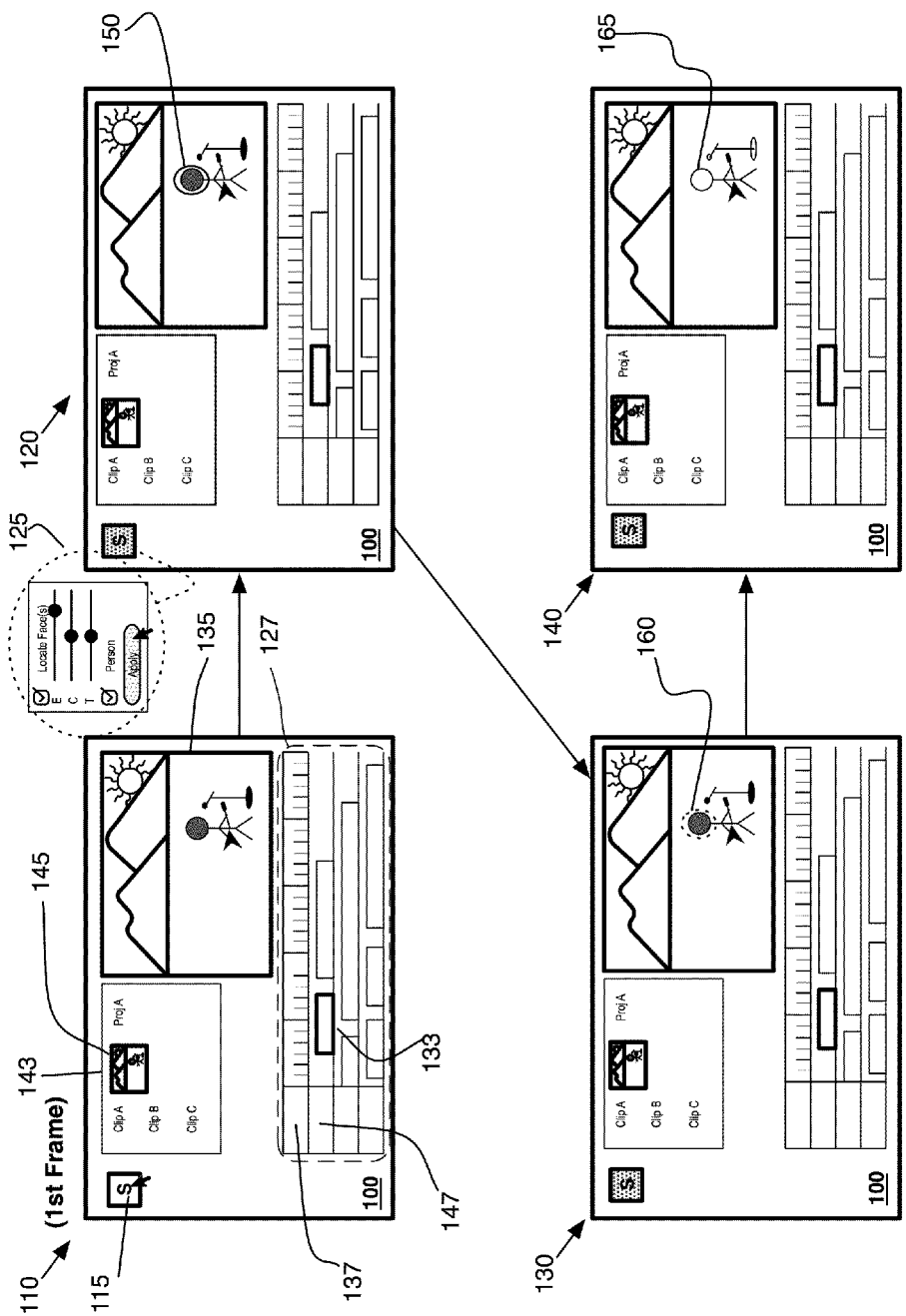
FIG. 1 illustrates a graphical user interface (GUI) of a media-editing application that includes an image-processing tool for automatically detecting a face and applying an image correction operation based on the location of the face of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed. For instance, examples of image processing for correcting images are described herein. However, one skilled in the art will appreciate that any type of image processing can be performed and remain within the scope of the invention.

Some embodiments of the invention provide a novel face-based, image-processing tool that performs image processing based on the location of one or more faces in one or more images. For instance, in some embodiments, this tool is used in a media editing application that composites one or more media clips to produce a composite media presentation. A media clip is a graphical representation of a piece of media content that is stored on the computing device on which the media editing application executes, or on a computing device to which the media editing application has access. Examples of such content include picture data, audio data, video data, text data, and/or other media data. The media clips on which the image-processing tool is used include picture or video content that may contain one or more faces of one or more people.

Different embodiments use different techniques to detect faces. For instance, some embodiments use face detection to automatically detect faces in video frames (e.g., frames of one or more video clips or frames of the composite video clip) or pictures. These embodiments then can perform one or more image processing operations to all faces detected in each of the video frames or pictures on a frame-by-frame basis that the tool automatically analyzes. For example, some embodiments use such a face detection technique to find each face and then increase the saturation of each face to make the face stand out in a video clip or in a set of pictures.

In detecting a face in a frame, the image-processing tool of some embodiments determines the location of the face in the frame as well as the geometric properties (e.g., size) of the face based on certain facial features (e.g., eyes, nose, forehead, etc.). The image-processing tool in some embodiments stores geometric properties of each face when it initially detects the face, so that it can associate the same face that it encounters in another frame to the previously detected face. In some embodiments, the image-processing tool can associate a name to each face that it detects through input that it receives from a user. The image-processing tool of some embodiments associates a name to a face using a database that stores different names for different faces when the image-processing tool utilize a face recognition technique to locate faces.

After detecting/and or identifying one or more faces and their locations in a video frame, the image-processing tool of some embodiments performs one or more image processing operations based on the location of the set of faces that it detected and/or identified in the video frame. By performing image processing operations, some embodiments change pixel values of some or all pixels of the frame. In some embodiments, the image-processing tool performs the set of image processing operations on several or all video frames of a video content in an automated manner that does not require the user to manually step through each frame to select a face or an operation. For instance, the automatic image processing operation of some embodiments do not require the user to perform any operation other than specifying the type of image processing operation(s) to perform and to select one or more faces to edit in only a subset of the video frames (i.e., in only some but not all of the video frames that are edited by the image processing operation(s)).

In some embodiments, the image-processing tool automatically selects a set of faces that it detected and/or identified in one or more frames, and tracks the set of faces over different frames in order to perform the set of image processing operations on the detected and/or identified faces. Alternatively, or conjunctively, the image-processing tool provides for user selection of faces that the tool detected and/or identified in one or more frames and tracks the user-selected faces through different frames in order to perform the same set of image processing operations on the selected faces. The image-processing tool of some embodiments also provides for user selection of image processing operations to perform on the automatically or manually selected faces.

In different embodiments, the image-processing tool can perform different sets of image processing operations based on the locations of the set of faces that it detects. Examples of such operations include (1) color correction operations that adjust the color attributes of each detected face (i.e., the color attribute of the pixels that form each face), (2) non-color based corrections that modify the appearance of the faces (such as filter-based operations that add, remove or otherwise modify the pixels that form each detected and/or identified face), and (3) image processing operations that modify areas in the frame other than the detected and/or identified faces, etc. Different embodiments provide different combinations of such image processing operations to the user of the media editing application.

Different combinations of image processing operations can be selected for different reasons, such as aesthetic reasons, narrative reasons, and/or technical reasons. Respective examples of the preceding reasons can include a desire to focus attention onto a particular person in the frame, a task of isolating a particular person from other people in the frame, and a need to improve the quality of the facial skin tones of the person.

To perform image processing operations on a face or an area of a frame other than a face, the image-processing tool of some embodiments generates a geometric shape around the face. Different embodiments use different types of geometric shapes. Examples of such shapes include circles, ellipses, squares, rectangles, or any other suitable shape about the face (e.g., any shape surrounding the face) in the frame. Also, different embodiments utilize different techniques to generate such geometric shapes. For each detected shape, some embodiments generate a custom geometric shape that is based on the geometric properties (e.g., the distance between the eyes) of the detected face. Irrespective of the type of shape and the manner that it is generated, the geometric shape isolates the area of the frame that includes the face. In this manner, the image-processing tool can use one or more geometric shapes to find one or more areas of the frame that include faces, and then use these geometric shapes to perform its image processing operations.

In addition to isolating the areas that include the faces to perform image processing, some embodiments use the generated geometric shape for each face to provide a gradual transition for the image processing that is applied to a face or to an area outside of a face. For instance, some embodiments use the geometric shape generated for a face to soften any image processing operation that is applied to the face or to an area outside of the face, in order to smooth the transition between the image processed portion of a frame and the non-image processed portion of the frame, or between different image processed portions of the frame.

Given that a video clip may contain many faces and an editor might only wish to modify some of the faces, the image-processing tool of some embodiments includes one or more controls for allowing the editor to select one or more faces from a set of faces that appear in the video clip. For instance, some embodiments allow the editor to select one or more frames to perform an initial face detection operation that selects one or more candidate faces. These embodiments then provide one or more user interface (UI) items that allow the editor to select, from the detected candidate faces, the subset of faces for automatic image processing in the set of frames examined by the editor (for selecting candidate faces) as well as in the other frames. Some of these embodiments also allow the editor to identify names for each of the faces that the editor selects or for each of the candidate faces.

In addition to, or instead of such controls, the image-processing tool of some embodiments also provides the editor with a set of controls for selecting the image processing operations to perform and/or for selecting the parameters associated with such operations. For instance, in some embodiments, the tool includes user-selectable controls (e.g., check boxes, slider controls, etc.) that allow the editor to select different faces for image processing, to specify the same or different image processing operations for different faces, and/or to specify image processing parameters for each specified image processing operation. A user of this tool can manipulate these selectable user interface items to customize the image processing operations that are applied to all the faces or to each face individually. Moreover, some embodiments provide user-selectable controls that allow the editor to specify how smoothly the image processing transitions between the space within each geometric shape and the space outside each geometric shape should be.

For a given video clip with multiple frames, some embodiments can track the movement of faces between different video frames. In these embodiments, the faces can be tracked by automatically computing the face parameters using the face detection techniques described above, and taking into account the movement of the faces. However, other embodiments can utilize techniques other than computing and/or matching facial attributes to track the movement of a face between different video frames of a video content or pictures in a set of pictures. For instance, the image-processing tool in some embodiments generates a chroma key based on skin tones of the detected face and then uses the chroma key to track the movement of the face between different frames or pictures. All skin tones have the same hue regardless of ethnicity because skin is transparent and contains red blood. Therefore, the use of the chroma key to track face movement is not complicated due to the ethnicity of a given person.

Some embodiments apply a face tracking technique that uses intensity gradients and color histograms. This tracking technique draws a geometric shape (e.g., an ellipse) around a detected face. The technique computes the intensity gradients along the shape's boundary and the color histogram of the shape's interior. The technique determines that two faces are the same face when the geometric shapes drawn around the two faces have matching intensity gradients along the shapes' boundaries and matching color histograms of the shapes' interiors. Other general object tracking techniques can also be utilized by some embodiments to track the detected faces. For instance, some embodiments may utilize an object tracking technique that tracks the kernel (e.g., shape and appearance) of a face or the silhouette (e.g., object area or region) of a face over several frames of an image sequence.

For those embodiments that use a chroma key described above, a chroma key is used for different purposes for different embodiments. For instance, some embodiments use the chroma key to further isolate the area surrounded by the above-described geometric shape for image processing. These embodiments apply image processing only to the portions within the geometric shape that match the chroma key. Further, other embodiments can use the chroma key for locating areas in the frame that contain exposed skin (e.g., arms, legs, etc.) to apply image processing. Thus, these embodiments can apply image processing to areas of the frame that match the skin tones in the chroma key.

One of ordinary skill in the art will understand that not all of the above-described features need to be performed by all embodiments of the invention. For instance, some embodiments might not use a geometric shape generated for each face to smoothen the image processing that is performed based on the location of the face. Also, one of ordinary skill in the art will appreciate that the image-processing tool of some embodiments is used in other applications that do not composite video clips. For instance, in some embodiments, this tool is used in a photo organizing and editing application to perform in an automated manner image processing on one or more pictures of the same individual. This tool can also be used in many other types of programs (e.g., operating systems, applications, etc.).

Several more detailed embodiments of the invention are described below. Section I describes some embodiments of automatically detecting and/or identifying faces and applying image correction of a media clip in a media editing application. Section II then describes processes for automatically detecting and/or identifying faces and applying image correction operations. Next, Section III describes a number of examples of image processing operations performed in some embodiments. Section IV describes face recognition techniques used for some embodiments. Section V describes the software architecture of a media-editing application of some embodiments. Lastly, Section VI describes an electronic system, which implements some of the embodiments of the invention.

I. Face-Based Image Correction

Some embodiments of the invention automatically locate one or more faces in one or more frames of video content and then apply image processing (e.g., image correction) to areas of the frames based on the locations of the faces. For each selected frame of video content, these embodiments go through multiple stages of operations. These stages, for selected frames of video content, are described in more detail in connection with FIGS. 1-3 as described below.

FIG. 1 illustrates a graphical user interface (GUI) of a media-editing application that includes an image-processing tool for automatically detecting a face and applying an image correction operation based on the location of the face in some embodiments. For the example described in FIG. 1, the image-processing tool can employ a face detection technique to find the face in the selected frame. An example face detection technique utilized by some embodiments is described further below by reference to FIG. 7. FIG. 1 illustrates GUI 100 at four different stages 110-140 that will be further described below after an introduction of the elements of GUI 100.

The GUI 100 includes a media library area 143, a composite display area 127, a user-selectable face-based image-processing item 115, and a preview display area 135. The preview display area displays a preview of a composite presentation that the application creates by compositing several media clips.

The media library 143 is an area in the GUI 100 through which the application's user can select media clips to add to a presentation that the user is compositing with the application. In the example of FIG. 1, all the clips from the media library are presented as thumbnails (e.g., thumbnail 145) that can be selected and added to the composite display area 127 (e.g., through a drag-and-drop operation or a menu selection operation). The clips in the media library may also be presented as a list, a set of icons, or some other appearance that allows a user to view and select the various clips in the library.

The composite display area 127 of the GUI 100 provides a visual representation of the composite presentation being created by the user. The composite display area 127 displays a timeline 137 that includes one or more clips (e.g., clip 133) representing one or more pieces of media content in the composite presentation. In some embodiments, the composite display area 127 includes one or more tracks (e.g., track 147) that span the timeline 137 of the composite display area 127. The media clips are placed in the tracks in these embodiments. In other embodiments, the composite display area 127 may be a trackless space (not shown) for placing the media clips. Several examples of a GUI of a media-editing application having a composite area with tracks or without tracks will be described further below.

The image-processing tool of some embodiments includes a selection item for activating the image-processing tool and two modules for automatically detecting a set of faces and for applying image processing based on the locations of the set of faces. More specifically, the face-based image-processing item 115 of the GUI 100 is a conceptual illustration of one or more user-selectable UI items that allow the user to activate the media-editing application's face-based image-processing tool.

Different embodiments of the invention implement this UI item differently. Some embodiments implement it as a face-based image-processing UI button, others as a face-based image-processing command that can be selected in a pull-down or drop-down menu, and still others as a face-based image-processing item command that can be invoked through one or more keystroke operations. Accordingly, the selection of the face-based image-processing item 115 can be received from a cursor controller (e.g., a mouse, touchpad, trackball, etc.), from a touchscreen (e.g., a user touching a UI item on a touchscreen), or from a keyboard input (e.g., a hotkey or a key sequence), etc. Yet other embodiments allow the user to activate the image-processing tool through two or more of such UI implementations or other UI implementations.

Once activated, the image-processing tool of some embodiments presents a set of GUI items 125 that includes different user-selectable UI items to perform automatic face detection and apply image correction to any faces found in the frame. In the example of this figure, the set of GUI items 125 includes a checkbox UI item ("Person") for selecting a detected face for image processing, a checkbox UI item ("Locate Face(s)") for indicating that automatic face detection was performed, a set of slider control UI items for adjusting image correction parameters, and a UI button ("Apply") for applying image processing for the face found in the frame.

Although the image-processing tool as described above includes the set of GUI items 125, the above description should not be construed as limiting the scope of the tool. For instance, the image-processing tool can include other user-selectable UI items such as additional slider control UI items, check box UI items, other button UI items, or any other UI items that correspond to different aspects of the face-based image-processing tool. The set of GUI items 125 can also be presented in a pull-down or drop-down menu or in a pop-up window. One example of image-processing tool UI will be further elaborated in FIG. 14 below.

The operation of the image-processing tool will now be described by reference to the state of the GUI 100 during the first through fourth stages 110-140 as illustrated in FIG. 1. In the first stage 110, the composite display area 127 displays a media clip 133 on the track 147 along the timeline 137. This stage also shows the GUI 100 after the user has selected the media clip 133 for processing by the face-based image-processing tool. The selection of the media clip 133 has been indicated by highlighting the media clip 133 in bold.

Although this example shows one selected media clip, one of ordinary skill in the art will appreciate that more than one media clip can be selected for processing by the tool. In some embodiments, these selected media clips can be clips that are on the same or different tracks in the composite display area 127. Further, a set of media clips can be selected from the media library 143 for processing by the tool in some embodiments.

As shown, the first stage 110 also illustrates that a selected frame for processing from the selected media clip 133 is displayed in the preview display area 135. In some embodiments, the user selects a particular frame of the selected media clip 133 for processing. Other embodiments select a frame automatically from the selected media clip 133. In this example, the first frame of the media clip 133 is selected and displayed in the preview display area 135. The first frame of the media clip 133 displays a person in a particular scene under a particular set of lighting conditions.

As further shown in the GUI 100, the user has selected the face-based image-processing item 115 with a mouse cursor to activate the image-processing tool that processes the first frame of the media clip 133.

The second stage 120 shows the GUI 100 after the image-processing tool has been activated. The activation of the image-processing tool is indicated by highlighting the image-processing item 115 in the second stage. When activated, the image-processing tool of some embodiments automatically detects any face(s) in the first frame of media clip 133 to determine the location of the face(s). In this example, the image-processing tool has found the face of the person in the first frame using a face detection technique.

After detecting the face in the first frame, the image-processing tool of some embodiments presents the set of GUI items 125 that includes different selectable UI items for applying image processing on any detected faces. In this example, the image-processing tool automatically selects the detected face for image processing as indicated by the checked checkbox UI item ("Person"). However, in some embodiments, the user can manually select the detected face for image processing by selecting the checkbox UI item. The set of GUI items 125 further shows that a user-selectable control slider ("E") corresponding to a color correction parameter for exposure has been adjusted to increase the amount of the exposure correction to apply.

As further shown in the second stage 120, the user has selected the UI button ("Apply") with the mouse cursor to perform the image processing operation for increasing exposure. When the user selects the UI button ("Apply"), the image-processing tool generates an ellipse 150 that isolates the area of the face for image processing.

The third stage 130 shows a dashed ellipse 160 that has replaced the original ellipse 150 about the detected face. This dashed ellipse represents an elliptical halo region about the detected face. The tool uses this region in order to provide a gradual decrease of the image processing that is applied to the detected face. This third stage is not a stage that is shown to the user in some embodiments. Rather, it represents a calculation step (e.g., an intermediate calculation stage) that is performed by the tool in order to process the frame.

The fourth stage 140 illustrates the GUI 100 after the image-processing tool applies the image processing for exposure correction based on the area of first frame isolated by the ellipse. As shown in the example, the face 165 in the first frame has been color corrected to increase the exposure of the face in the scene. As a result, the face 165 is more visually noticeable in the scene of the first frame.

As described before, the image-processing tool of some embodiments can employ a face detection technique to find the face in the frame. In these embodiments, the image-processing tool generates face parameters for the detected face. In some embodiments, such face parameters include geometric properties of the face, the location of the face and of the face features (such as eyes, nose, mouth, etc.), and other information that can be computed based on these (such as elongation and width of the face, etc.). The geometric properties of some embodiments include the size, shape, and/or orientation of the detected face. The location of the face is typically given by the center coordinates of the face. The locations of face features such as eyes and mouth of the face are given by their respective coordinates. In addition, the image-processing tool of some embodiments also generates a set of facial animation parameters (FAPs) from a detected face. As known in the art, facial animation parameters relate to facial expressions.

In some embodiments, the concatenation of the computed face parameters is referred to, as a feature vector for the detected face. A feature vector is a vector of a certain dimension (e.g., of dimension two if the vector has two components) that numerically represents a face in an image or a frame through the collection of the parameters computed for the face. These embodiments subsequently store these parameters. As will be described further below, these face parameters may be used for a face tracking technique that some embodiments may utilize to track the detected faces in other frames.

Different embodiments store the face parameters at different times. Some embodiments store the face parameters before an image processing operation is initiated, while other embodiments store the parameters after the user has initiated the image processing operation on the frame (e.g., after the user has selected the UI button ("Apply") to initiate image processing described above).

In some embodiments, other parameters are generated by the image-processing tool. For instance, some such embodiments generate a chroma key parameter. Specifically, the image-processing tool of some embodiments generates a chroma key of a detected face by sampling a set of pixels in a region of the detected face. The image-processing tool generates the chroma key based on an assumption that the region from which the set of pixels is sampled is skin. As a result, this technique of generating the chroma key obviates the requirement to manually select a skin color for the chroma. In some embodiments, the generated chroma key is then stored.

The image-processing tool can use the above-described chroma key for isolating different portions of the frame for image processing. For instance, it might be desirable to perform a particular image processing operation on only regions of the face that include the skin. In such cases, the image-processing tool uses the chroma key to further locate areas of skin within the ellipse surrounding the face. In these embodiments, the image-processing tool applies image processing to only the identified areas within the ellipse that match the chroma key (i.e., skin tones). In the example of FIG. 1, the image-processing tool can use a chroma key to apply the exposure correction only to areas of the face with matching skin tones within the ellipse. Other embodiments forgo generating the ellipse and instead use the chroma key to identify areas of the frame that match the skin tone. In other words, in these embodiments all areas in the frame that contain skin (such as hands, feet, legs, face, etc.) are isolated for image processing.

The above example described in FIG. 1 discusses the use of face detection technique to find a face and perform image processing for the face in a frame of a media clip. For other frames of the selected media clip, some embodiments of the media-editing application perform similar stages for each particular selected frame. That is, in these embodiments, the user manually steps through the frames to select the face and the image processing operation. In other words, the image-processing tool automatically detects faces in each frame and the user selects one or more faces and specifies the image processing operation, if any, to perform for the faces in each frame.

Rather than processing remaining frames of a media clip on a frame-by-frame basis, some embodiments automatically perform operations that are similar to the ones described above for FIG. 1 for one or more remaining frames of the selected media clip so that the user is not required to manually step through each frame to select the face or the image processing operation for the face. For example, some of these embodiments that employ face detection automatically detects faces in each frame of the selected media clip and performs the specified image processing operation for the detected faces. For those embodiments that employ face detection, the respective stages for automated operations on an ith frame of the selected media clip in FIG. 2 and an nth frame of the selected media clip in FIG. 3 are described below.

Figure 2:
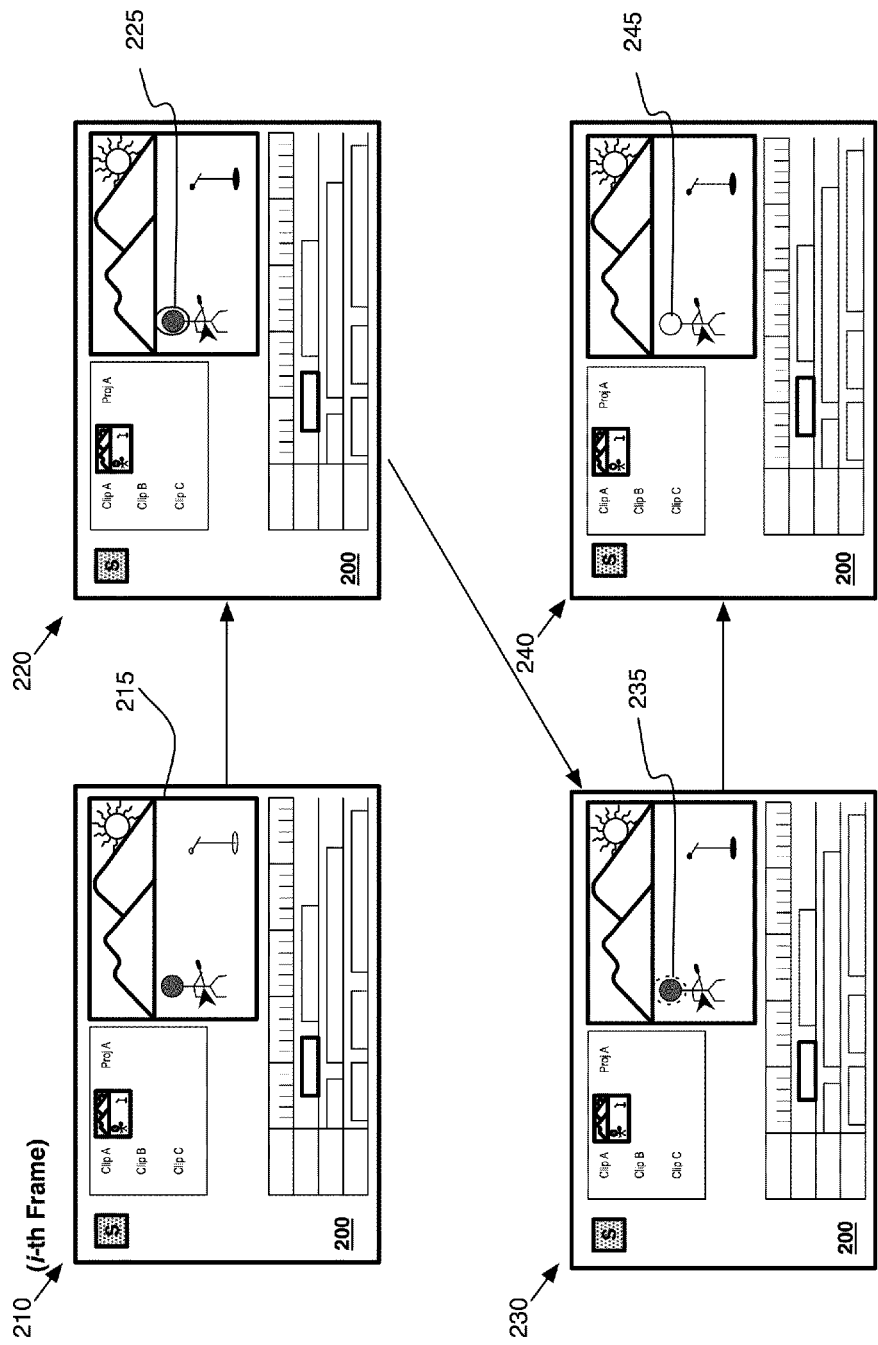
FIG. 2 illustrates a GUI of the media-editing application for automatic face detection and image processing of an ith frame of the media clip of some embodiments.
Figure 3:
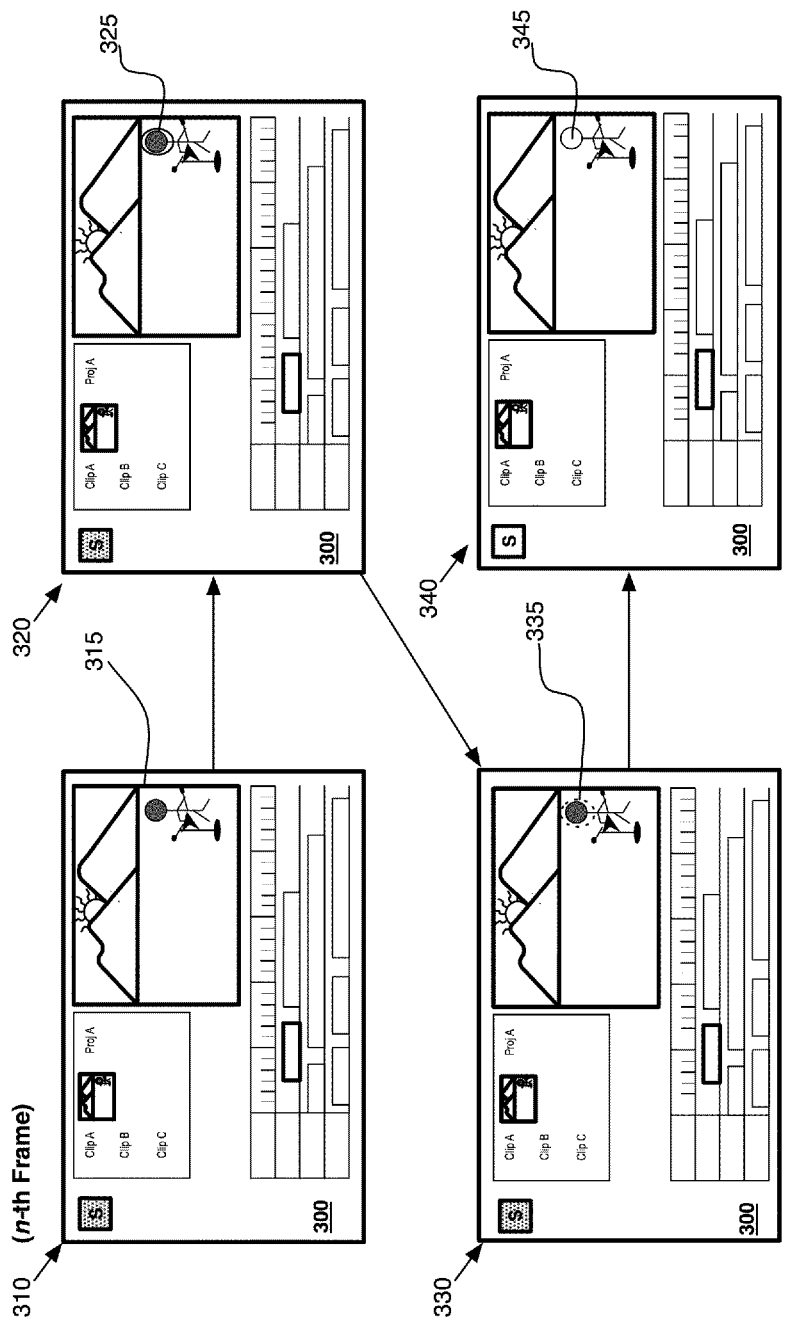
FIG. 3 illustrates a GUI of the media-editing application for automatic face detection and image processing of an nth frame of the media clip of some embodiments.

FIG. 2 illustrates a GUI of the media-editing application for automatic face detection and image processing of an ith frame of the media clip of some embodiments. The ith frame of some embodiments is the second frame of video content from the selected media clip or another subsequent frame of video content. In this example, the image-processing tool automatically selects the ith frame for processing. FIG. 2 illustrates a GUI 200 at four different stages 210-240. The GUI 200 is similar to the GUI 100 of FIG. 1.

The first stage 210 shows that the ith frame (e.g., a frame after the frame shown in FIG. 1) is displayed in the preview display area 215. In the example illustrated in FIG. 2, the position of the person's face in the ith frame has changed in comparison with its position from the first frame described in FIG. 1. The image-processing tool performs face detection and uses face parameters to track the position of the person's face from the first frame to the ith frame.

In particular, the image-processing tool of some embodiments can track the face from the first frame to a subsequent frame by locating a similarly sized face in the subsequent frame. In these embodiments, the image-processing tool can use the face parameters for the face detected in the first frame to match the face detected in the subsequent frame. An example face tracking technique is described further below by reference to FIG. 9.

Also, as mentioned earlier, some embodiments generate a chroma key of the skin tone of the face detected in the first frame. In some of these embodiments, the image-processing tool uses this chroma key to track the face in the subsequent frame. For example, an area of the subsequent frame that matches the chroma key can indicate the position of the face in the subsequent frame.

After the face is located, the image-processing tool uses the geometric properties of the face from the face parameters to calculate the size of the ellipse to enclose the person's face in the ith frame. The second stage 220 illustrates the generated ellipse 225 around the face of the person identified from the first stage 210.

Next, the third stage 230 illustrates that the image-processing tool has generated an elliptical halo region 235. This region is similar to the region 160 of FIG. 1 and it is produced for the same reason, i.e., to provide for a gradual transition of the image processing that is applied to the detected face. Also, like the third stage 130 of FIG. 1, the third stage 230 of FIG. 2 is not a stage that is shown to the user in some embodiments, but rather is a representation of a calculation that is performed by the tool in some embodiments to smoothen the transition of the image processing.

Finally, the fourth stage 240 shows that the image-processing tool has applied the exposure correction to the area isolated by the ellipse as shown in the example as face 245. The face 245 is now more visually prominent in the ith frame than before the image processing was applied.

The above-described example in FIG. 2 can utilize the face parameters and/or the chroma key to track the face from frame to frame. Alternatively, or conjunctively, some embodiments apply a motion prediction technique based on the tracked history of the face's motion to assist in the tracking of the face between frames. For example, the image-processing tool can search for a position of the face in the ith frame by searching in areas near the location of face in the previous frame to identify a potential facial pattern.

Moreover, some embodiments apply face tracking techniques that do not use motion information. For instance, some embodiments utilize a face tracking technique that uses intensity gradients and color histograms. This tracking technique draws a geometric shape (e.g., an ellipse) around a detected face. The technique computes the intensity gradients along the shape's boundary and the color histogram of the shape's interior. The technique determines that two faces are the same face when the geometric shapes drawn around the two faces have matching intensity gradients along the shapes' boundaries and matching color histograms of the shapes' interiors.

The image-processing tool of some embodiments then continues to automatically process other frames from the selected media clip to automatically detect the face and apply the same type of image processing so that the user is not required to manually step through each subsequent frame to select the face or the image processing operation.

FIG. 3 illustrates a GUI of the media-editing application for automatic face detection and image processing of an nth frame of the media clip of some embodiments. The nth frame of some embodiments is the last frame of the selected media clip or another subsequent frame where n>i. FIG. 3 illustrates a GUI 300 at four different stages 310-340. The GUI 300 is similar to the GUI 100 of FIG. 1.

The first stage 310 illustrates that the nth frame is displayed in the preview display area 315. In this example, the nth frame shows a change in the position of the person's face and a change in the lighting conditions of the frame in comparison with the ith frame mentioned above. For example, the position of the person's face can change as the person moves closer or further away from the camera capturing the scene. With respect to lighting conditions, the lighting conditions of the scene can vary according to changes of the light sources (e.g., changes in the luminance and/or position of light sources).

The image-processing tool of some embodiments performs the face detection technique and the face tracking technique on the nth frame to determine the location of the person's face after factoring in the changes to the position of the face and the lighting conditions. Therefore, the face detection and tracking techniques are able to account for changes in different types of image data in the nth frame to detect and track the person's face.

In the second stage 320, the image-processing tool has generated the ellipse 325 to isolate the area of the frame where the face is located in the nth frame. The image-processing tool of some embodiments generates the ellipse 325 based on the stored geometric properties of the face (i.e., from stored face parameters). Next, in the third stage 330, the image-processing tool generates the elliptical halo region 335. This region is similar to the region 160 of FIG. 1 and it is produced for the same reason, i.e., to provide for a gradual transition of the image processing that is applied to the detected face. Also, like the third stage 130 of FIG. 1, the third stage 330 of FIG. 3 is not a stage that is shown to the user in some embodiments, but rather is a representation of a calculation that is performed by the tool in some embodiments to smoothen the transition of the image processing.

Finally, the fourth stage 340 illustrates the GUI 300 displaying the person's face 345 after the image-processing tool has applied the exposure correction to the ellipse 335 from the third stage 330. Again, the face of the person is more visually prominent in the frame after the exposure correction has been applied.

One of ordinary skill in the art will realize that the image-processing tool that is described above is only one example of how some embodiments automatically detect a face and apply image processing based on the location of the detected face. Other embodiments might perform these operations differently. For instance, while the examples illustrated in FIGS. 1-3 are described by reference to a single face, other embodiments might have more faces. Moreover, other embodiments might selectively perform image correction of a selected face among other detected faces from the video content. These two particular examples are now described in connection with FIGS. 4 and 5 that follow. For the examples described in FIGS. 4 and 5, the image-processing tool can employ a face detection technique to uniquely find a set of faces in the selected frame.

Figure 4:
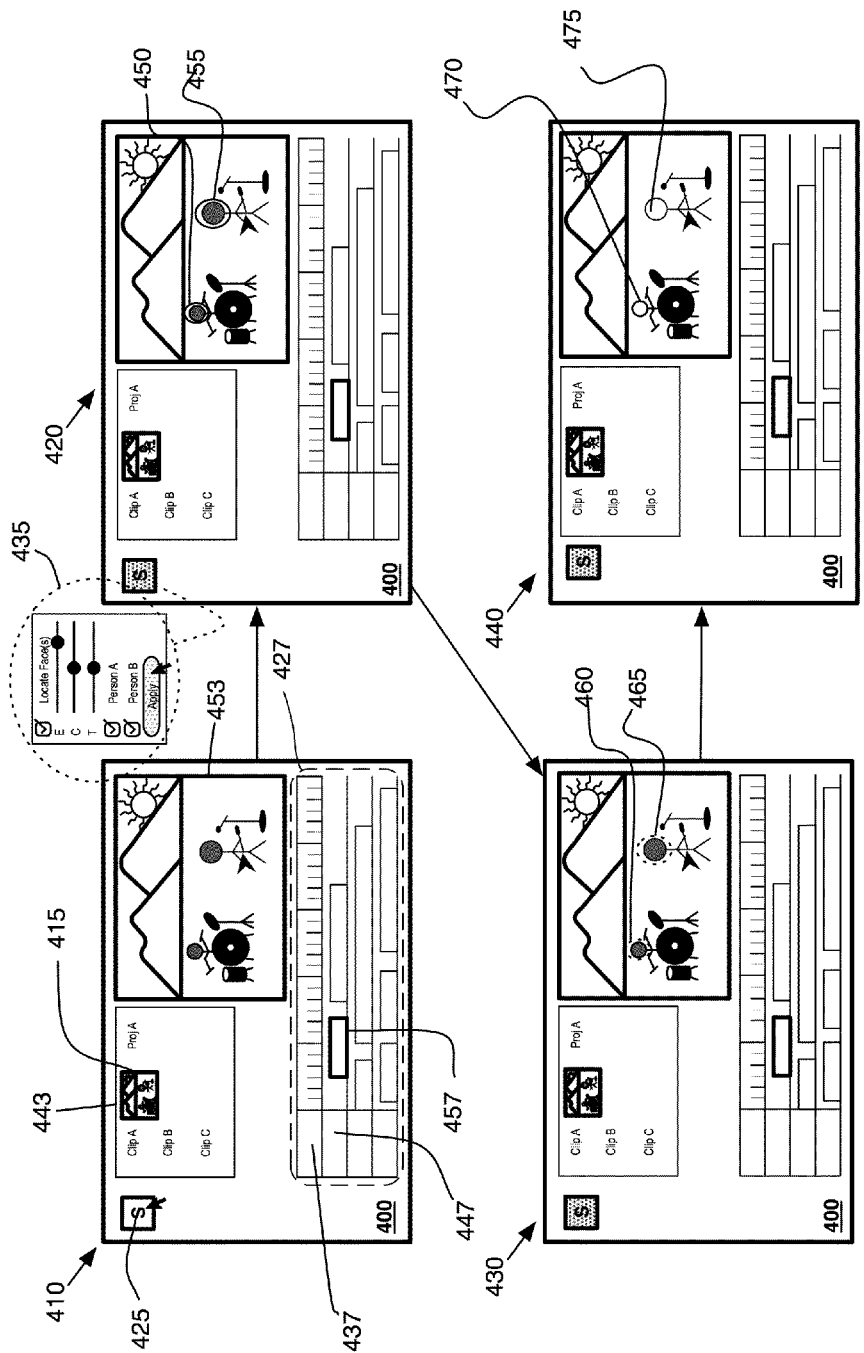
FIG. 4 illustrates a GUI of the media-editing application for automatically detecting faces and applying image processing of multiple faces of some embodiments.

FIG. 4 illustrates a GUI of the media-editing application for automatically detecting faces and applying image processing of multiple faces of some embodiments. The example illustrated in FIG. 4 shows the GUI 400 in four different stages 410-440. Aspects of the GUI 400 are similar with respect to corresponding portions of GUI 100 described above by reference to FIG. 1. Therefore, these similar aspects of the GUI 400 are not described in order to avoid unnecessary repetition that would obscure the description of FIG. 4.

As illustrated in this example, the GUI 400 includes a media library area 443, a composite display area 427, a face-based image-processing item 425, and a preview display area 453. The media library area 443 includes a thumbnail 415 corresponding to selected media clip 457. The composite display area 427 displays the media clip 457 on a track 447 that spans a timeline 437.

The first stage 410 shows that the preview display area 453 displays a selected frame from the selected media clip 457. The user has selected the media clip 457 (e.g., as indicated in bold) for processing by the media-editing application's image-processing tool. As shown, the frame of this example includes multiple faces. Specifically, the frame shows two different people in a particular scene under a particular set of lighting conditions.

The first stage 410 further shows the selection of the face-based image-processing item 425 with a mouse cursor to activate the image-processing tool. As described before, the face-based image-processing item 425 is a conceptual illustration of one or more UI items that allow the media-editing application to activate its face-based image-processing tool.

The second stage 420 illustrates the GUI 400 after the image-processing tool has been activated. In some embodiments, after activation, the image-processing tool automatically detects any face(s) in the selected frame to determine the location of the face(s). As discussed before, some embodiments employ a face detection technique to find faces and store face parameters and other parameters for subsequent use. In this example, the image-processing tool has found two faces corresponding to two different people using a face detection technique.

After detecting the faces in the selected frame, the image-processing tool of some embodiments presents a set of GUI items 435 that includes different user-selectable UI items for applying image processing on any detected faces. As shown in the example, the image-processing tool includes the set of GUI items 435 that includes corresponding user-selectable checkbox UI items ("Person A" and "Person B") for selecting the detected faces for image processing, a user-selectable checkbox UI item ("Locate Face(s)") for indicating that automatic face detection was performed, a set of user-selectable slider control UI items for adjusting image correction parameters, and a user-selectable UI button ("Apply") to apply image processing based on the faces in the frame. In this example, the image-processing tool automatically selects the detected faces for image processing as indicated by the two checkbox UI items in the set of GUI items 435. Alternatively, or conjunctively, other embodiments instead have the user manually select the detected faces for image processing.

As further shown in the set of GUI items 435, the user has adjusted a slider control UI item to adjust an exposure correction parameter to increase the exposure of the selected faces. The user has selected the UI button ("Apply") in the set of GUI items 435 to perform this image processing operation. After the user has selected the UI button ("Apply"), the image-processing tool has generated ellipses 450 and 455 that isolate the respective areas of the two selected faces for image processing.

The third stage 430 shows that the image-processing tool has generated the elliptical halo regions 460 and 465. These regions are similar to the region 160 of FIG. 1 and they are produced for the same reason, i.e., to provide for a gradual transition of the image processing that are applied to the detected faces. Also, like the third stage 130 of FIG. 1, the third stage 430 of FIG. 4 is not a stage that is shown to the user in some embodiments, but rather is a representation of a calculation that is performed by the tool in some embodiments to smoothen the transition of the image processing.

The fourth stage 440 then shows the GUI 400 with the image-processed faces 470 and 475 after the exposure correction is applied based on the areas isolated by the ellipses. As shown, the faces 470 and 475 are more visually prominent in the scene captured in the frame after increasing the exposure of the faces.

Although the example in FIG. 4 illustrates four different stages for a particular frame from the selected media clip, the operations described above for FIG. 4 can be automatically performed for any remaining subsequent frames from the selected media clip so that the user is not required to manually step through each subsequent frame to select the faces or the image processing operation. In this manner, the image-processing tool processes more than one frame and can process the entirety of the frames from the media clip in an automated manner.

Figure 5:
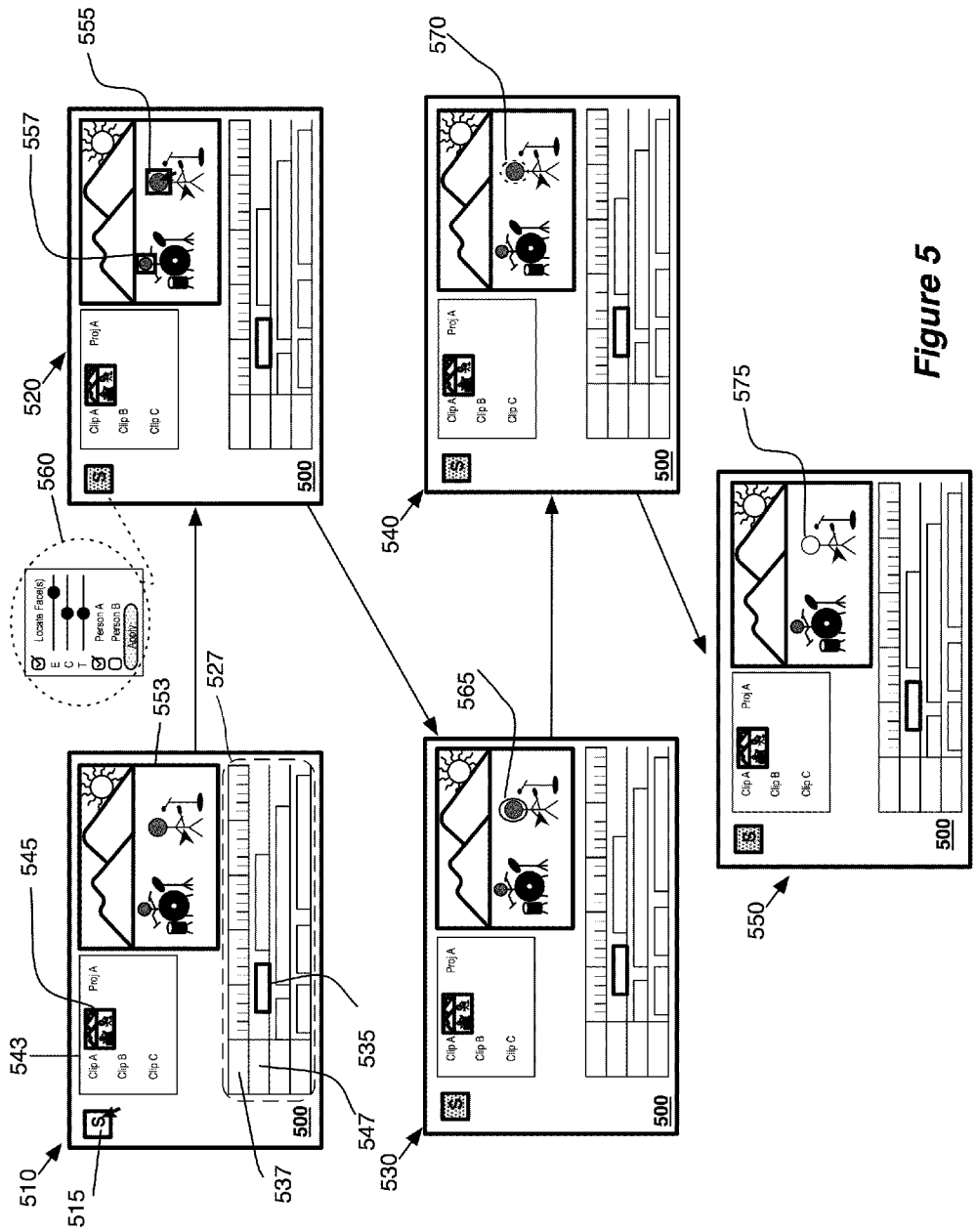
FIG. 5 illustrates a GUI of the media-editing application for automatically detecting faces and selectively applying image processing of a selected face of some embodiments.

Some embodiments of the image-processing tool can automatically detect faces and selectively apply image processing for a selected set of faces. FIG. 5 illustrates a GUI 500 of the media-editing application for automatically detecting faces and selectively applying image processing of a selected face of some embodiments. In the example shown in FIG. 5, the image-processing tool of some embodiments also performs a face recognition technique in order to identify a person to which each detected face belongs.

The example shown in FIG. 5 illustrates the GUI 500 in five different stages 510-550. Again, aspects of the GUI 500 are similar to corresponding portions of GUI 100 of FIG. 1. Therefore, these similar aspects of GUI 500 are not discussed to avoid unnecessary repetition that would complicate the description of FIG. 5.

As shown in this example, the GUI 500 includes a media library area 543, a composite display area 527, a face-based image-processing item 515, and a preview display area 553. The media library area 543 includes a thumbnail 545 corresponding to selected media clip 535. The composite display area 527 displays the media clip 535 on a track 547 that spans a timeline 537. The user has selected the media clip 535 (e.g., as indicated in bold) for processing by the media-editing application's image-processing tool.

The first stage 510 of the example shows the preview display area 553 displaying a representative frame from the media clip 535. The user has selected the media clip 535 (e.g., as indicated in bold) for automatic face detection and image processing based on all the faces found in the frame. The frame of this example includes two faces of two different people in a particular scene shot in a particular set of lighting conditions.

The first stage 510 further shows the selection of the face-based image-processing item 515 with a mouse cursor to activate the image-processing tool. As described before, the face-based image-processing item 515 is a conceptual illustration of one or more UI items that allow the media-editing application to activate its face-based image-processing tool.

The second stage 520 shows the GUI 500 after the image-processing tool has been activated. After activation, the image-processing tool automatically detects every face in the selected frame to determine the location of the face(s). As discussed before, some embodiments employ a face detection technique to find faces. The image-processing tool also generates and stores face parameters and other parameters for subsequent use. In the example of FIG. 5, the image-processing tool has found two faces. Moreover, the image-processing tool also finds that the two faces correspond to two different people in the selected frame, using a face recognition technique.

The second stage 520 further shows the preview display area with selectable indicators 557 and 555 corresponding to the locations of detected faces in the frame to allow the user to select a set of faces for image processing. In this example, the user has selected the indicator 555 with the mouse cursor to designate the corresponding face for image processing.

Although the example shows the selectable indicators as surrounding boxes around the detected faces, other embodiments can display the selectable indicators in different ways. For example, the GUI 500 can display the selected indicators with any suitable graphical indicator (e.g., polygon, x-spot, asterisk, etc.) that serves as a visual indicator of the location of the detected faces in the frame.

After the user has selected the face, the image-processing tool of some embodiments presents a set of GUI items 560 that includes different selectable UI items for applying image processing on any selected faces. As shown, the image-processing tool includes the set of GUI items 560 that includes corresponding checkbox UI items ("Person A" and "Person B") for indicating the selected, designated faces for image processing, a checkbox UI item ("Locate Face(s)") for indicating that automatic face detection was performed, a set of slider control UI items for adjusting image correction parameters, and a UI button ("Apply") to apply image processing based on the selected, designated faces.

In this example, the user has selected the face corresponding to the selectable indicator 555 in the second stage 520. As shown in a set of GUI items 560, the selected face is now designated for image processing as indicated by the corresponding checkbox UI item ("Person A"). Furthermore, a corresponding checkbox UI item is deselected ("Person B") for the non-selected, non-designated face as shown in the set of GUI items 560.

As further shown in the set of GUI items 560, the user has adjusted a slider control UI item to adjust an exposure correction parameter to increase the exposure of the selected, designated face. The user then selects the UI button ("Apply") in the set of GUI items 560 to perform this image processing operation for the selected, designated face.

Next, the third stage 530 illustrates the GUI 500 after the user has selected the UI button ("Apply") in the second stage 520. As shown, the image-processing tool has generated ellipse 565 that isolates the respective area of the selected, designated face for image processing.

The fourth stage 540 shows that the image-processing tool has generated the elliptical halo region 570. This region is similar to the region 160 of FIG. 1 and it is produced for the same reason, i.e., to provide for a gradual transition of the image processing that is applied to the detected face. Also, like the third stage 130 of FIG. 1, the fourth stage 540 of FIG. 5 is not a stage that is shown to the user in some embodiments, but rather is a representation of a calculation that is performed by the tool in some embodiments to smoothen the transition of the image processing.

Finally, the fifth stage 550 shows the face 575 after the exposure correction is applied to the area isolated by the ellipse. As shown, face 575 is more visually prominent than the other unprocessed face in the scene because the exposure of face 575 has been increased.

Although the example in FIG. 5 illustrates five different stages for a particular frame from the selected media clip, the operations described above for FIG. 5 can be automatically performed for any remaining subsequent frames from the selected media clip and the selected faces are automatically tracked so that the user is not required to manually step through each subsequent frame to select and designate the faces for image processing or select the image processing operation. In this manner, the image-processing tool processes more than one frame and can process the entirety of the frames from the media clip in an automated manner.

Although the above examples illustrated in FIGS. 1-5 describe performing an exposure correction based on a particular face or multiple faces, some embodiments can apply other types of image processing and still be within the scope of the invention. Moreover, some embodiments can apply image processing operations to some or all detected faces. Therefore, the above examples should not be construed as limiting the scope of the invention.

The above examples of FIGS. 1-5 describe some embodiments that perform face detection based on one or more faces from a particular media clip. However, some embodiments can perform automatic face detection and image processing for multiple media clips. For instance, after determining the face parameters and/or auxiliary parameters from a first media clip, some embodiments can search the frames of a second media clip to determine a particular frame that includes the best match of a particular face based on the face parameters and/or auxiliary parameters. These embodiments can then use this particular frame of the second media clip to generate face parameters to perform automatic face tracking and image processing for the other frames of the second media clip. Furthermore, the auxiliary parameters such as the chroma key and motion prediction data as mentioned before can be based on this particular frame to assist in performing face tracking in the other frames of the second media clip.

In the sections below, processes that automatically detect and track any face(s) and apply image processing based on the located face(s) are described in connection with FIGS. 6-13. Some embodiments of these processes are implemented by the face-based image-processing tool mentioned above.

II. Processes for Face-Based Image Processing

Some embodiments automatically detect and/or identify one or more faces for a single video frame and perform image processing on any detected and/or identified face(s) in the frame. Additionally, some embodiments can process multiple video frames for one or more faces. To automatically process multiple video frames based on location of one or more faces in the video frames, some embodiments (1) initially have an editor designate in one or more frames a face or a subset of faces for image processing, and then (2) automatically detect the designated faces in other frames to perform image processing based on the location of these detected faces.

Sub-section II.A describes an overall process for automatically locating and tracking faces in an image sequence and applying image processing operations to the detected faces. Sub-section II.B describes an example face detection technique. Sub-section II.C describes temporal correlation and filtering operations. Sub-section II.D describes one exemplary image processing operation. Sub-section II.E describes several example processes that some embodiments perform. Sub-section II.E.1 describes a process for automatically detecting every face in a single frame and applying image processing based on the location of the detected face(s). Sub-section II.E.2 describes several processes for automatically detecting every face and applying image processing for multiple frames. In particular, sub-section II.E.2.i describes a process for designation of face(s) on which to perform image processing. Sub-section II.E.2.ii then describes the process for automatically detecting and tracking the designated face(s) and performing the image processing.

A. Overview Process

Figure 6:
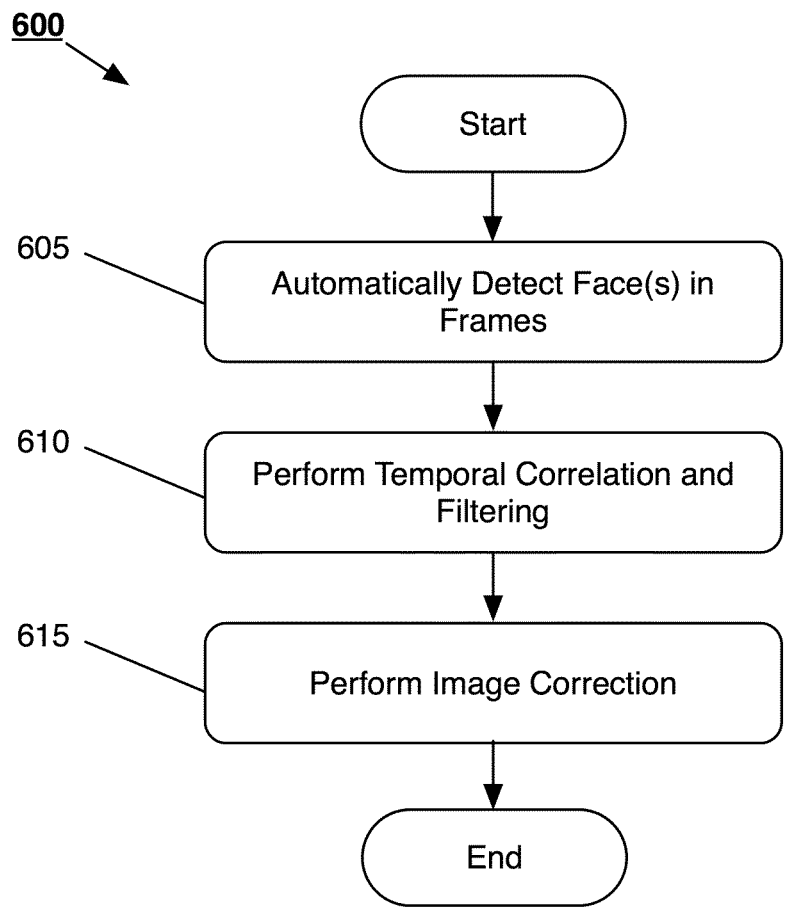
FIG. 6 conceptually illustrates a process that some embodiments perform to automatically detect one or more faces in an image sequence and apply image processing to the detected faces.

FIG. 6 conceptually illustrates a process 600 that some embodiments perform to automatically detect one or more faces in an image sequence and apply image processing to the detected faces. An image sequence includes a multiple number of frames and is part of a media clip in some embodiments. The process 600 starts when it receives an image sequence.

The process 600 begins by automatically detecting (at 605) one or more faces in the received image sequence. That is, the process 600 automatically locates one or more faces in each of the frames in the received image sequence. Different embodiments employ different face detection techniques to automatically detect faces. For instance, some embodiments perform a face detection technique that utilizes a sliding-window technique. An example of face detection technique utilizing a sliding-window technique is described below by reference to FIG. 7. In some embodiments, the process 600 generates a list of faces and face parameters associated with each detected face for each frame in the image sequence. As mentioned earlier, the face parameters for a detected face include geometric properties of the face, the location of the face and of the face features (such as eyes, nose, mouth, etc.), and other information that can be computed based on these (such as elongation and width of the face, etc.). Also, some embodiments compute facial animation parameters. These computed face parameters are assembled typically in a feature vector.

At 610, the process 600 performs temporal correlation and filtering operations. The process attempts to correlate each detected face in each frame of the image sequence with a face detected in frames that are temporally prior to or ahead of the frame in the image sequence. The process performs this temporal correlation operations in order to track detected faces over time (i.e., over different frames in the image sequence) and to find inconsistencies (e.g., areas of a frame that are detected as faces only occasionally over a range of frames in the image sequence) in some embodiments. The process also filters out false positives. That is, the process removes any areas of each frame that are incorrectly detected as faces from the list of faces for the frame. Therefore, the process improves the accuracy of face detection by filtering.

In addition, the process in some embodiments generates a face registry, which includes an entry for each uniquely detected face in the image sequence. The face registry is used to associate a face in one frame with the same face detected in another frame (i.e., used to track faces). The face registry also includes a refined list of faces (i.e., a list of faces that does not include the same face more than once) and the parameters associated with each face in the refined list. More details of temporal correlation and filtering will be described below by reference to FIG. 9.

At 615, the process 600 performs image processing operations. In some embodiments, the image processing operations include a color correction (e.g., exposure, saturation, etc.) and/or a non-color based correction (e.g., blemish removal) to the detected faces. For example, the face 165 of FIG. 1 illustrates the result of an exposure correction applied based on the area isolated by the ellipse 160. In some embodiments, the process 600 uses the list of faces that was generated at 605 and refined at 610 and the parameters associated with the faces in the refined list to apply image correction operations to the detected faces. More details of performing image correction operations are described below by reference to FIG. 10.

B. Face Detection

Figure 7:
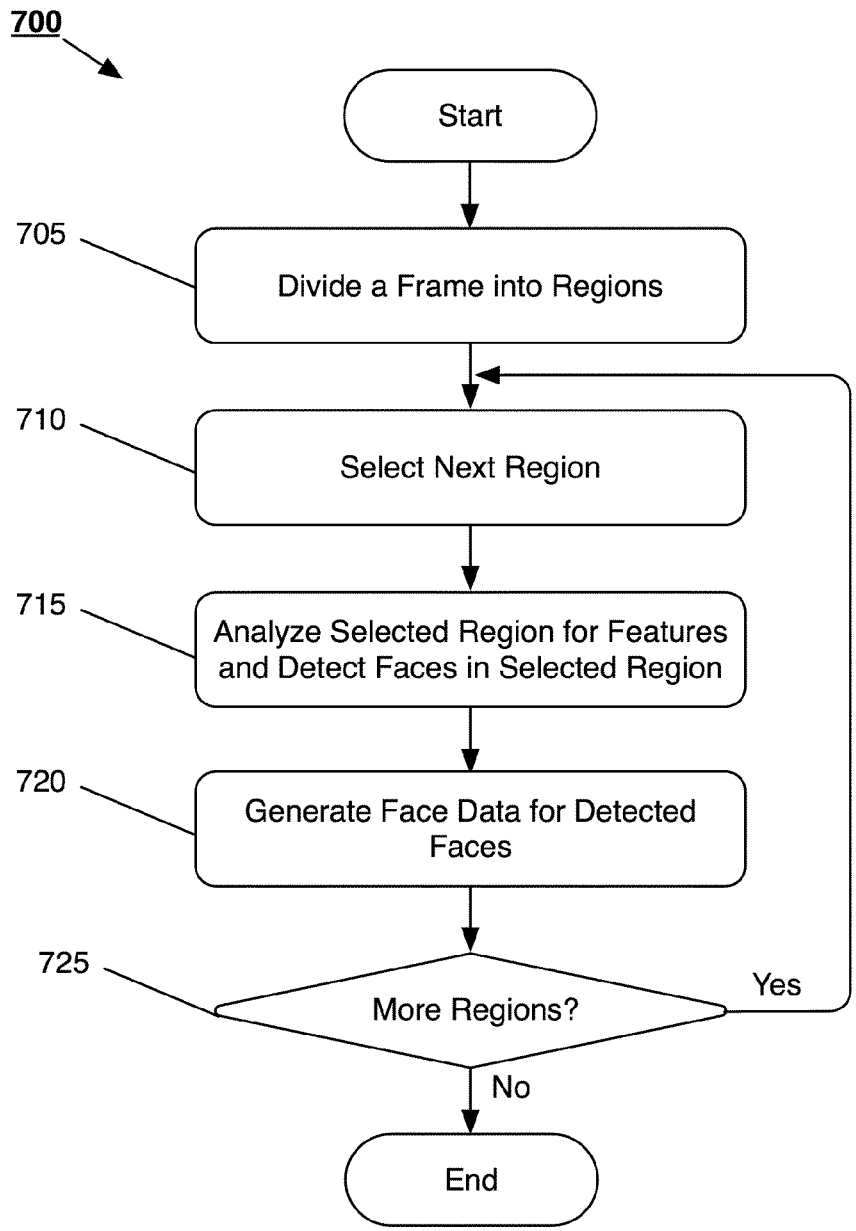
FIG. 7 conceptually illustrates a process that some embodiments perform to automatically detect one or more faces in a frame of an image sequence.
Figure 8:
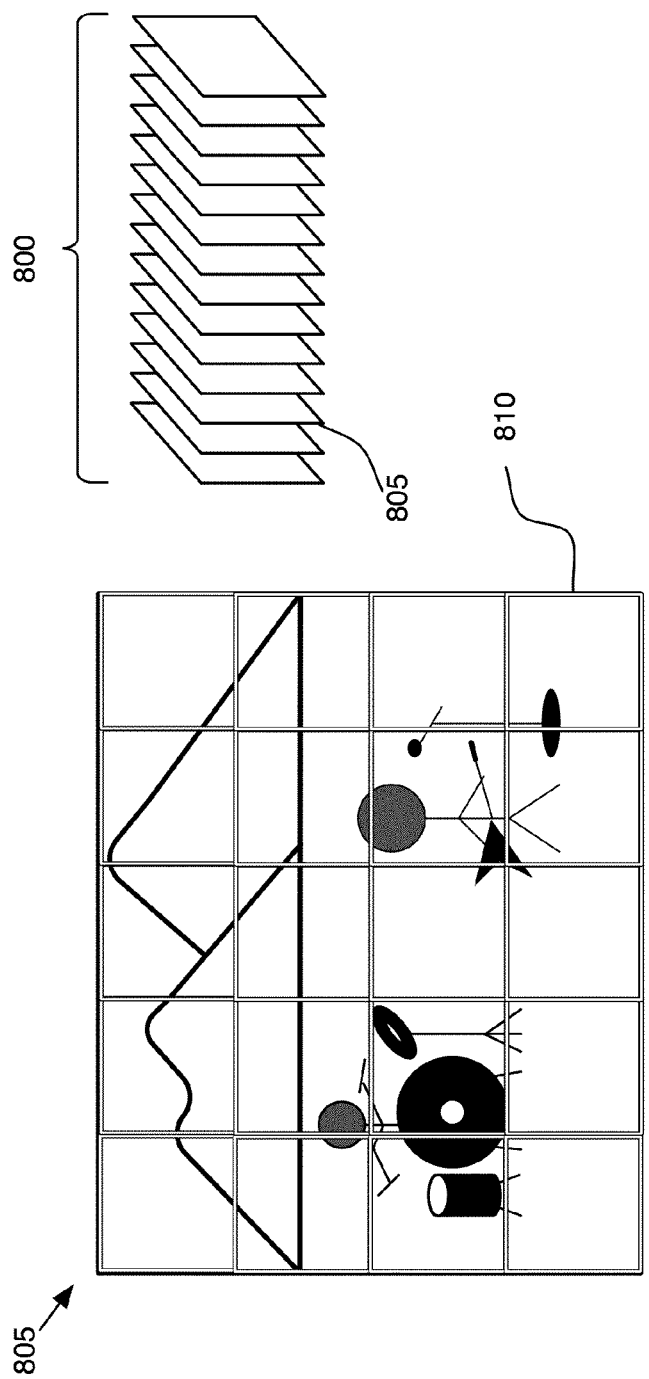
FIG. 8 illustrates a frame of an image sequence.

FIG. 7 conceptually illustrates a process 700 that some embodiments perform to automatically detect one or more faces in a frame of an image sequence of a media clip. Specifically, FIG. 7 illustrates a face detection technique that utilizes sliding-window technique. The process will be described by reference to FIG. 8. FIG. 8 illustrates a frame 805 of an image sequence 800. The process 700 starts when it receives a frame of the image sequence.

The process 700 begins by dividing (at 705) the received frame into several regions. The process divides the frame into several regions in order to scan the frame with a fixed-size rectangular window (e.g., 24×24 pixel window) and to apply one or more classifiers to the sub-image defined by the window. The process in some embodiments may use windows of different scales and orientations and scan the frame with each window at a time. As an example, the frame 805 of FIG. 8 is divided into twenty regions for sub-images defined by a rectangular window 810.

Next, the process 700 selects (at 710) a region from the divided regions. At 715, the process 700 then analyzes the region for features and detect faces in the region. In some embodiments, the process utilizes a set of classifiers in different shapes and scales. Because numerous possible classifiers could be defined with different shapes and scales, the set of classifiers to be used is just a subset of the classifiers that are trained on example faces in some embodiments. The subset of classifiers is selected from the trained classifiers. Some of the classifiers in the subset are combinations of the trained classifiers in some cases. The process extracts from the region features (e.g., points, edges, objects, etc.) of various shapes and scales in accordance with the shapes and scales of the set of classifiers. The process runs the set of classifiers against features at different locations within the region to detect faces in the region.

At 720, the process 700 generates face data for the faces detected in the region. The face data in some embodiments include a list of detected faces and face parameters associated with each detected face. As described earlier, the face parameters for a detected face include geometric properties of the face, the location of the face and of the face features (such as eyes, nose, mouth, etc.), and other information that can be computed based on these (such as elongation and width of the face, histogram of pixels within the face, etc.). Also, the face data that the process generates may include facial animation parameters. These computed face parameters are assembled typically in a feature vector.

The process 700 then determines (at 725) whether there are more divided regions to analyze. When the process determines (at 725) that there are more regions, the process loops back to 710 to select another region of the frame. For instance, the process would select one of regions of the frame 805 in FIG. 8 that have not been analyzed. The process also removes multiple detections of the same face as the process goes through different regions of the frame in order to avoid counting the same face more than once. When the process 700 determines (at 725) that there are no more regions to analyze, the process 700 ends.

C. Temporal Correlation and Filtering

Figure 9:
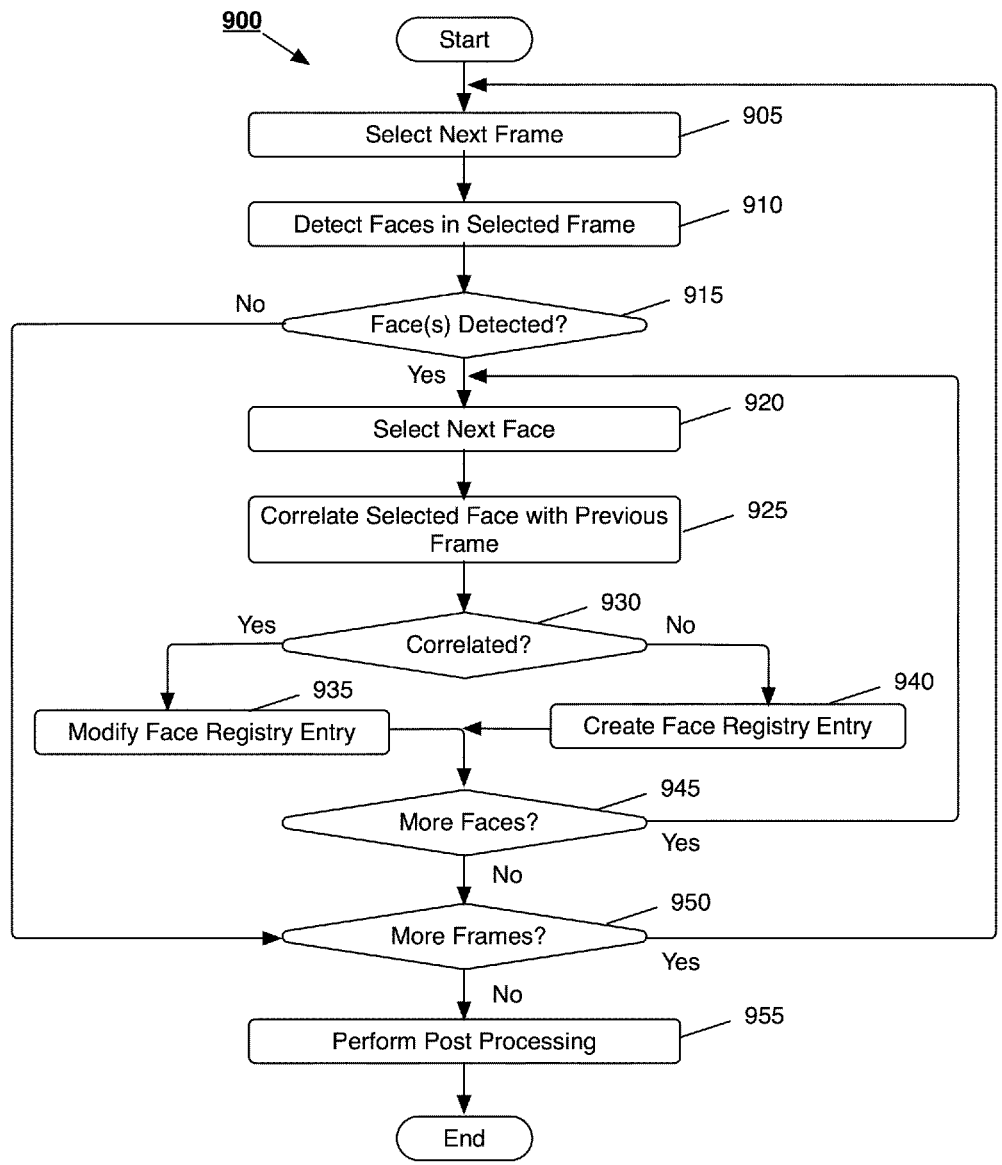
FIG. 9 conceptually illustrates a process that some embodiments perform to detect and correlate faces in the frames of an image sequence and filter out areas of frames that are incorrectly detected as faces.

FIG. 9 conceptually illustrates a process 900 that some embodiments perform to detect and correlate faces in the frames of an image sequence of a media clip and filter out areas of frames that are incorrectly detected as faces. The process 900 starts when it receives an image sequence. The process 900 begins by selecting (at 905) a frame of the received image sequence. Next at 910, the process 900 automatically detects faces in the selected frame. In some embodiments, the process 900 employs a face detection technique, such as the process 700 of FIG. 7 described above.

At 915, the process 900 determines whether any face(s) are detected in the selected frame. When no face is detected in the frame, the process 900 proceeds to 950, which will be described further below. When at least one face is detected in the frame, the process 900 proceeds to 920 to select a detected face. The process 900 then correlates (at 925) the selected face in the selected frame with a face in a previously processed frame in the image sequence. That is, the process 900 looks for a face detected in previously examined frame(s) that matches to the selected face. In some embodiments, the process 900 determines a match using a face registry which includes an entry for each unique face detected in the image sequence. When the selected frame is the first frame that the process examines, there is not yet a previously examined frame and therefore there are no entries in the face registry. When the selected frame is not the first frame that the process examines and there are one or more faces detected in previously examined frame(s), entries should exist in the face registry for those detected faces.

The process 900 then determines (at 930) whether the selected face has a matching face found in previously examined frame(s) of the image sequence. The process determines a match using the information included in the entries for the detected faces. The information included in a face registry entry for a face includes (1) identifications of the frames in which the face is detected, (2) location of the face (e.g., the center coordinates of the face) in each of the frames in which the face is detected, (3) locations of features such as eyes and mouth of the face in each of the frames in which the face is detected, and (4) a feature vector for each face in some embodiments. When the process 900 determines (at 930) that there is a matching face in the face registry, the process 900 modifies (at 935) the face registry entry for the matching face with the information for the selected face in the selected frame. When the process 900 determines (at 930) that there is not a matching face in the face registry, the process 900 creates (at 940) a new face registry entry for the selected face. In some embodiments, the process can add a name in the new face registry entry for each face through input that it receives from a user or through face recognition (e.g., by using a database that stores different names for different faces).

Next, the process 900 determines (at 945) whether there are more detected faces in the selected frame. When the process 900 determines (at 945) that there are more detected faces in the selected frame, the process 900 loops back to 920 to select another detected face to examine. Otherwise, the process 900 determines (at 950) whether there are more frames in the image sequence left to examine. When the process 900 determines (at 950) that there are more frames to examine, the process 900 loops back to 905 to select another frame of the image sequence.

In this manner, the process 900 populates and updates the face registry such that each registry entry represents a unique face. When there is no more frame to select at 950, the process 900 then performs (at 955) a post processing operation to examine and modify the face registry entries. For instance, the process 900 removes false positives (i.e., areas of frames that are incorrectly detected as faces). The process 900 also finds faces that were not detected in one or more frames of the sequence by inspecting the face registry entries. That is, using the information included in the face registry entries, the process plots the temporal trajectory of each detected face in the image sequence and determines whether the face should have been detected at certain locations in certain frames of the image sequence. The process 900 also generates a refined list of faces and the associated parameters for each face in the list from the face registry entry in some embodiments. The list of faces and the associated parameters are used to automatically place an ellipse-shape mask, as will be described further below.

One of the ordinary skill in the art will recognize that there are other existing methods that can increase face detection accuracy by utilizing some combinations of color, luminance (gradient), and other motion information. However, the manner in which the process 900 improves face detection accuracy by temporally correlating faces and filtering out false positives provides much better performance (i.e., consumes much less computational resources) than those existing methods.

D. Image Processing Operation

Figure 10:
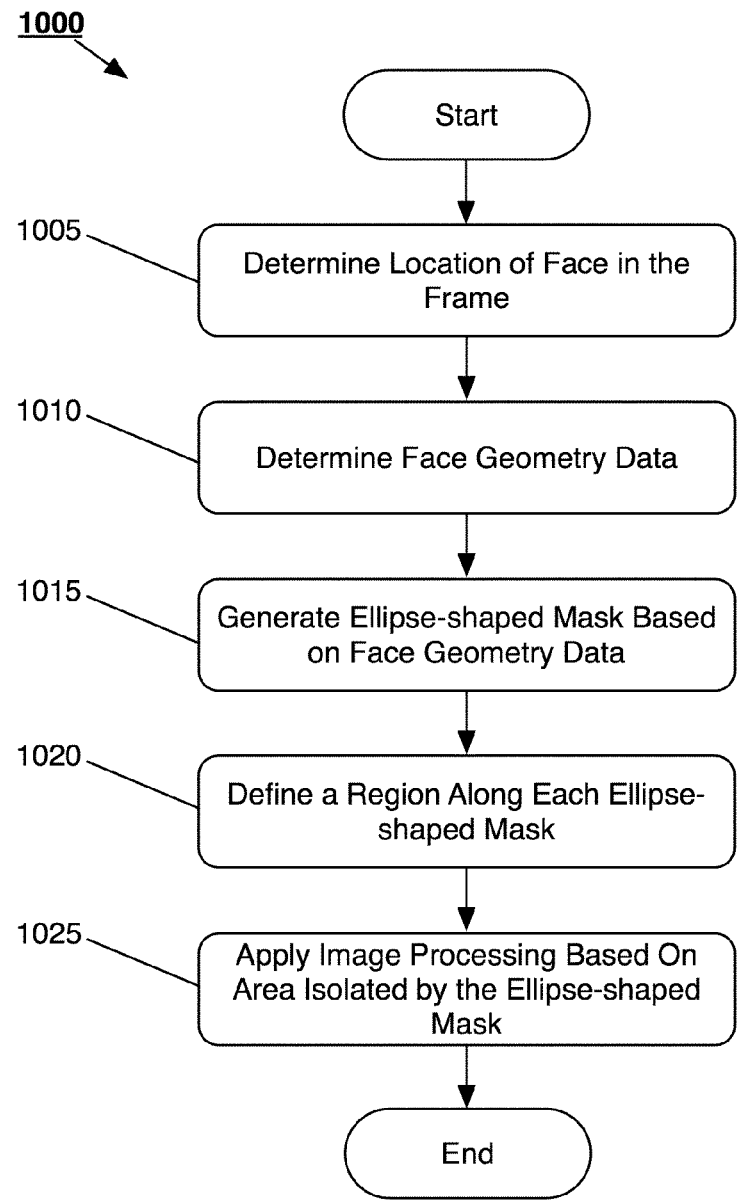
FIG. 10 conceptually illustrates a process that is performed by some embodiments to apply image processing to an ellipse generated for designated face(s) for image processing.

FIG. 10 conceptually illustrates a process that is performed by some embodiments to apply image processing to an ellipse generated for detected face(s) for image processing. The detected faces in some embodiments are automatically selected for image processing. Alternatively, other embodiments allow a user to selectively designate a set of faces for image processing. This process will be described by reference to the example described by reference to relevant portions of FIG. 1.

At 1005, the process 1000 determines the location of each designated face for image processing in the frame. In some embodiments, the process 1000 determines the location of the face using the position parameter from the face parameters generated while detecting faces as described above. In the example of FIG. 1, the image-processing tool of some embodiments generates the position parameter of the detected face in the frame after performing face detection for the frame. The position parameter of some embodiments specifies a single pixel point in the frame as the center of the face.

One of ordinary skill in the art would appreciate that the position parameter could be specified in different ways and still be within the scope of the invention. For example, the position parameter could specify a range of pixels in the frame such as a height range and/or a width range as the location of the face.

After 1005, the process 1000 determines (at 1010) the geometric properties of each detected, designated face. The process 1000 of some embodiments determines the geometric properties of the face from the position parameter of the face parameters. In the case where the location of the face is specified as a single pixel point in the frame, the process 1000 determines the geometric properties of the face from calculating the distance from detected facial features, such as the eyes and/or nose of the face. For instance, the process of some embodiments determines the geometric properties of the face from the distance between the eyes of the face.

The process 1000 generates (at 1015) an ellipse-shaped mask around each detected, designated face. One example of such an ellipse is the ellipse 150 shown in FIG. 1. Different embodiments calculate the ellipse differently. In some embodiments, the process 1000 calculates the ellipse for a face from the stored location and size parameters of the face. For instance, some embodiments use a statistical average for the height/width ratio of a face as the height/width ratio of the ellipse-shaped mask. In such cases, the size of ellipse-shaped mask is scaled based on one or more of the size parameters of the face (e.g., distance between the eyes of the face).

In other embodiments, the process 1000 generates the ellipse-shaped mask based on a bounding box that encompasses the face when the face is detected. The width of this bounding box is used to define the width of the ellipse. To define the height of the ellipse, the process uses a predetermined multiplier on the average width. For example, the process can multiply the average width by 1.5 to define the height of the ellipse. After the process calculates the size of the ellipse, the process 1000 rotates it based on the stored orientation parameter of the face.

After 1015, the process 1000 uses (at 1020) the ellipse-shaped mask to soften the image processing that is applied based on the location of each designated face. The example of FIG. 1 illustrates the softening of the image processing by showing the ellipse 160 with dashed edges. Different embodiments soften the image processing based on the location of the ellipse differently. For instance, some embodiments define an elliptical halo region around the ellipse. These embodiments then define two-dimensional slices within this halo region, with each slice having four sides. Two of these sides are straight lines that traverse through the interior of the halo region, while the other two sides are arcs, one on the interior elliptical circumference of the halo region and the other on the exterior elliptical circumference of the halo region. In some embodiments, the interior elliptical circumference of the halo region is the ellipse that is defined about the face.

For each two-dimensional slice within the halo region, some embodiments specify a parameter value for each divisible segment of the slice that is at a different distance from the center of the halo. For instance, in some embodiments that apply an image processing operation to the interior of the ellipse that is located about a face, the parameter value starts at 1.0 for the interior arc portion of the slice, and gradually decreases until reaching 0 for the exterior portion of the slice. This parameter value is then used to gradually decrease the effect of the image processing operation on the halo region about the ellipse.

Alternatively, the image-processing tool can generate the elliptical halo region in the following manner:
For each pixel [P(x,y)] in the image:
 1. Normalize (x,y) such that maximum dimension (width or height) ranges from 0 to 1
 2. Offset (x,y) by ellipse center
 3. Rotate (x,y) such that the axes of the oriented ellipse are x/y axis-aligned
 4. Multiply y by the aspect ratio
 5. Compute the distance d from (x,y) to the center of the ellipse
 6. Multiply d by the scale (e.g., a scaling factor for shrinking or zooming the image)
Then, the resulting values of ds are clamped such that the values lie in a certain range. The pixels having d values in the range form the elliptical halo region.

At 1025, the process 1000 applies the image processing to the frame based on the area isolated by the ellipse-shaped mask. As described before, a color correction (e.g., changing the exposure, saturation, etc.) and/or a non-color based correction (e.g., applying filtering) can be applied to the areas defined by their respective ellipse-shaped masks. For example, the face 165 of FIG. 1 illustrates the result of an exposure correction applied based on the area isolated by the ellipse 160. Alternatively as mentioned before, the image processing of other embodiments can be applied to an area of the frame outside of the ellipse-shaped mask. After 1025 the process 1000 ends.

E. Example Processes
 1. Single Frame Processing

In some embodiments, an editor (i.e., user) uses the image-processing tool to process frames of video content in a frame-by-frame manner. In other words, the user selects a single frame for processing by the image-processing tool to automatically detect any face(s) in the frame and then apply image processing based on the locations of the face(s).

Figure 11:
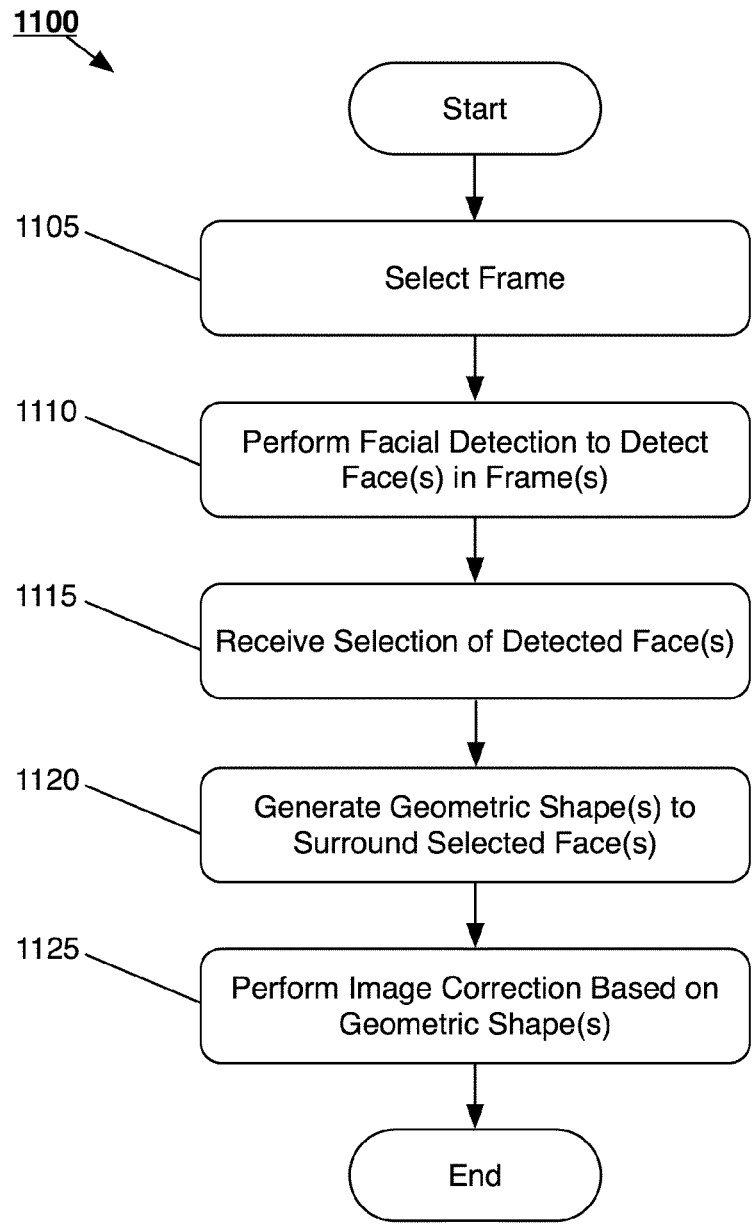
FIG. 11 conceptually illustrates a process that is performed by some embodiments of the invention to automatically detect face(s) and apply image processing on any detected face(s) in a single video frame.

FIG. 11 conceptually illustrates a process 1100 that is performed by some embodiments of the invention to automatically detect one or more faces and apply image processing to the detected faces in a single video frame. This process will be described by reference to certain portions of the above-described examples of FIGS. 1, 4 and 5.

The process 1100 starts when the user activates the image-processing tool. In some embodiments, the image-processing tool is activated when the user selects the selection item in the GUI of the media-editing application (e.g., the face-based image-processing item 115 in FIG. 1). At 1105, the process 1100 selects a frame for processing. In some embodiments, the process 1100 automatically selects the frame. Alternatively, or conjunctively, the process of some embodiments allows the user to select any single frame of the video content for processing. For example, the user can scan through the frames of video content to select one particular frame for processing.

Once the frame has been selected, the process 1100 (at 1110) detects any face(s) in the selected frame using a face detection technique. In the example of FIGS. 4 and 5, two faces are detected in the selected frame, while in the example of FIG. 1, one face is detected in the selected frame.

After 1110, the process 1100 (at 1115) receives a selection of one or more of the faces detected at 1110 and designates the selected face(s) for image processing. In some embodiments, the process 1100 automatically selects one or more detected faces. Alternatively, or conjunctively, the process 1100 allows the user to select a subset of faces among the detected faces. One example is shown in FIG. 5 when the user selects the indicator 555 to designate the face of "Person A" for image processing. As a result, the face of the other person ("Person B") in FIG. 5 is excluded from image processing.

Next, the process 1100 (at 1120) generates a geometric shape around each selected face. In some embodiments, the geometric shape is an ellipse-shaped mask that is generated using geometric properties of the face as described above by reference to FIG. 10. One example of such an ellipse is the ellipse 150 shown in FIG. 1. Moreover, as described before, the image-processing tool can generate a respective elliptical halo region for each ellipse to provide for a gradual transition of the image processing that is applied to the detected faces.

After 1120, the process 1100 (at 1125) performs an image correction based on the geometric shape(s). In some embodiments, the image-processing tool automatically determines the image correction operation to perform. For example, the image-processing tool can automatically perform an image processing operation for increasing the saturation level of the area of the frame isolated by the geometric shape. Alternatively, the user can select the image correction operation to perform. Moreover, the process 1100 of some embodiments can perform the image correction operation on the area enclosed by the geometric shape or on an area outside of the geometric shape. After 1125, the process ends.

Although the above process was described by reference to processing a single frame, one of ordinary skill in the art will appreciate that process 1100 could be performed to process frames of video content in a frame-by-frame manner. In other words, the user can initiate the process 1100 to automatically detect the face(s) and apply image processing based on the location of the face(s) for a selected frame and then repeat process 1100 for any other selected frame.

2. Multi-Frame Processing i. Selection of Faces

Some embodiments of the invention provide for a user selection of detected faces in the frame. Specifically, some embodiments allow a user to select a face or a subset of faces among multiple faces in one or more frames to designate these faces for image processing. In other words, the user can exclude certain faces for image processing in some embodiments. Alternatively, or conjunctively, other embodiments automatically select some or all detected faces to designate these faces for image processing.

Figure 12:
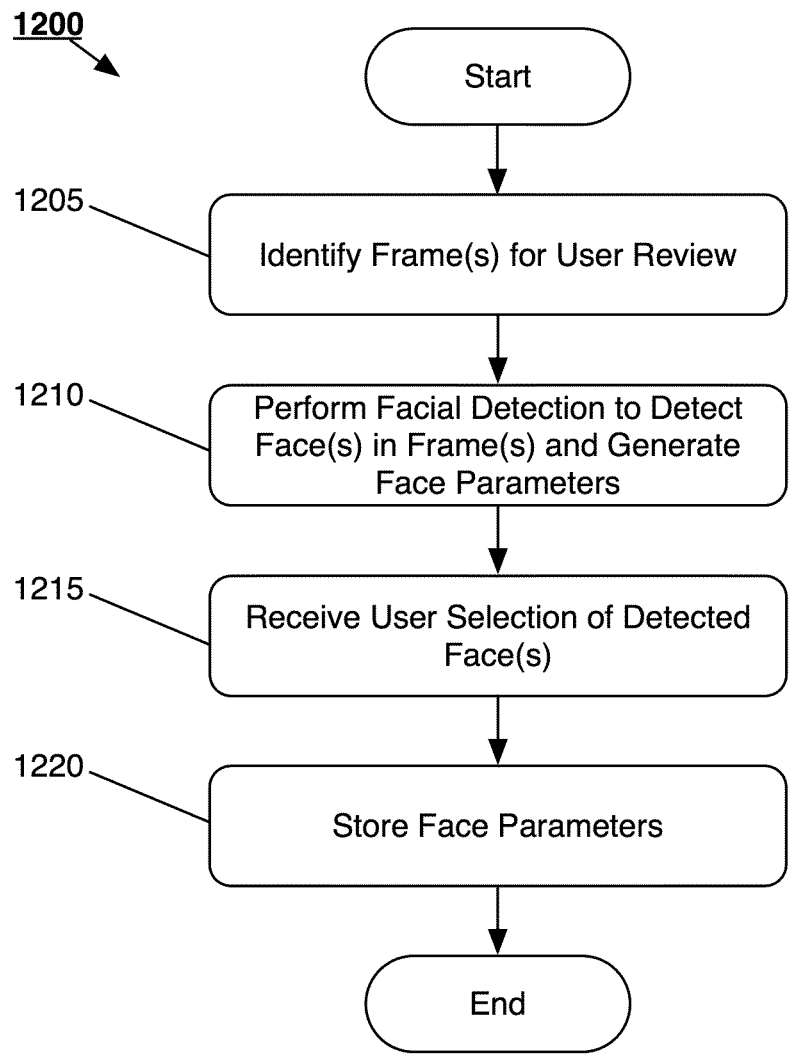
FIG. 12 conceptually illustrates a process that is performed by some embodiments to implement a user selection of detected faces in a frame.

FIG. 12 conceptually illustrates a process 1200 that is performed by some embodiments to implement a user selection of detected faces in a frame. This process will be described by reference to certain portions of the above-described examples of FIGS. 1, 4 and 5.

The process 1200 starts when the user activates the image-processing tool. In some embodiments, the image-processing tool is activated when the user selects the selection item in the GUI of the media-editing application (e.g., the face-based image-processing item 115 in FIG. 1). As shown in FIG. 12, the process initially identifies (at 1205) one or more frames of the video content for the user to review. In some embodiments, the process 1200 automatically selects the frame(s) that the user should review to select the face(s) to use for image processing. Alternatively, or conjunctively, as described above by reference to FIG. 1, the process of some embodiments allows the user to select one or more frames in the video content (e.g., the first frame in the media clip 133) to analyze and identify the subset of faces for processing. For example, the user can scan through the frames of video content to identify one or more particular frames to review to identify the subset of faces. Once the frame(s) has been identified, the process 1200 continues to 1210.

At 1210, the process 1200 performs face detection to find all faces in the frame(s) identified at 1205. FIGS. 1, 4, and 5 provided examples of performing face detection on frames identified by a user to find the set of candidate faces for the user to review and select. In the example of FIGS. 4 and 5, two faces are found in the frame after face detection, while in the example of FIG. 1, one face is found in the frame identified by the user. Different embodiments perform the face detection operation (at 1210) differently. Some embodiments use face detection methods or techniques, such as Viola-Jones Face Detection method, Neural Networks learning and classification methods, or a combination thereof. Other embodiments employ the face detection technique described above.

In different embodiments, the process (at 1210) generates different sets of face parameters for the faces that it detects. For instance, in some embodiments, the process (at 1210) generates for each detected face the position (i.e., the location) of the face, the size of the face, and the orientation of the detected face in the frame. The position parameter of some embodiments specifies the location of the face in the frame. In particular, the position parameter indicates the center of the face in the frame. In some cases, the center of the face is the location of the nose on the face. With respect to the size parameter, this parameter specifies the size of the face. In some cases, the size of the face can be determined from the distance between the eyes of the face in comparison with statistical data regarding the average size of the face based on this distance between the eyes. Lastly, the orientation parameter specifies the geometric orientation of the face in the frame.

After 1210, the process (at 1215) receives the user's selection of one or more of the faces detected at 1210 and designates the selected face(s) for image processing. As mentioned above, some embodiments allow the user to select a subset of faces among the detected faces. One example is shown in FIG. 5 when the user selects the indicator 555 to designate the face of "Person A" for image processing. As a result, the face of the other person ("Person B") in FIG. 5 is excluded from image processing. Although the example of FIG. 5 shows that the user has selected a single face as the selected subset, the image-processing tool of some embodiments allows the selected subset of faces to include more than one face (e.g., all), as described above by reference to FIG. 4. Alternatively, or conjunctively, the process automatically selects some or all detected faces on which to perform image processing operations. Moreover, in the example of FIG. 5, a face recognition technique has been performed to relate the detected faces to specific individuals.

Next, at 1220, the process 1200 stores the face parameters for the detected face(s), so that these parameters can be used to track the detected face(s) in other frames (e.g., in frames reviewed and not reviewed by the editor) in order to perform image processing based on these faces in these other frames. In some embodiments, only the face parameters for the selected faces are stored. In other embodiments, the face parameters of all detected faces are stored. In these embodiments, the face parameters can include data that indicates which face or faces among the detected faces were selected for image processing at 1215. After storing the face parameters, the process 1200 ends.

The stored face parameters of some embodiments are subsequently used to track face(s) in a selected frame(s) and are used to generate respective geometric shapes isolating areas of the selected frame(s) that include the face(s) as further described in the following description of FIGS. 13 and 10.

ii. Automatically Examining Frames, Detecting Faces and Performing Image Processing Based on Location of Detected Faces FIG. 13 conceptually illustrates an automated process 1300 of some embodiments that examines several or all of the frames of video content, detects and tracks selected faces in the examined frames, and performs image processing based on the location of the detected faces. This process will be described by reference to certain portions of the examples that were described in FIGS. 1-5.

The process 1300 starts when a frame of video content is selected at 1305 for processing. In the example illustrated in FIG. 1, a first frame from the media clip 133 is automatically selected. In other embodiments, the process 1300 can automatically select any other frame for processing. For example, in the examples of FIGS. 2 and 3, an ith frame and an nth frame of video content are respectively selected for processing automatically, where the ith frame is a subsequent frame from the first frame and the nth frame is the last or any subsequent frame from the ith frame.

After 1305, the process 1300 performs (at 1310) face detection to determine the locations of any face(s) in the frame. As mentioned before, face parameters (i.e., position, size and orientation) are generated for each detected face from the face detection in some embodiments. Additionally, if the face parameters have been previously stored, the process 1300 can track the face(s) in the frame using these parameters. For example, the process 1300 can match the face in the frame with the stored size parameter to track a previously detected face.

After 1310, the process 1300 (at 1313) then determines whether face detection and tracking was successful. If the face detection and tracking was not successful (e.g., none or only some of the selected faces were found in the frame), the process 1300 (at 1350) prompts a user to manually locate any face(s) in the frame. In some cases, the face detection can fail to locate the face(s) due to various factors. For example, the face could be obscured or occluded by other objects in a scene depicted in the frame. After 1350, the process 1300 ends. In some embodiments, after the process 1300 ends, operation 1335 is performed on the frame that the user was prompted to manually select face(s) at 1350. This allows the remaining frames of the video content to be processed by the process 1300 after it is interrupted for the user to manually locate face(s) in a frame. Some embodiments, however, do not determine whether the face detection was successful. In these embodiments, the process 1300 instead goes directly to 1315 after 1310 and no interruption is initiated.

Some embodiments initiate the interruption when the composite presentation includes more than one media clip. For example, after processing a first media clip, the process 1300 can prompt the user to manually locate faces after the process selects a new media clip for processing. Therefore, the interruption is provided in between processing two different clips in these embodiments.

If the process 1300 determines (at 1313) that the face detection and tracking was successful, the process 1300 selects (at 1315) a face that has been detected in the frame. At 1320, the process 1300 determines whether the selected face from 1315 is selected for image correction. If so, the process 1300 continues to 1330. Otherwise, the process 1300 continues to 1335. In the example of FIG. 1, a single face is detected in the frame and then automatically selected for image correction as shown in the set of GUI items 125. Alternatively, the example shown in FIG. 4 illustrates multiple faces that are detected in the frame and automatically selected as shown in the set of GUI items 435. Further, FIG. 5 illustrates an example where user input selects the indicator 555 to select the face of a first person (i.e., "Person A") between two different people for image processing.

After determining that the selected face has been selected for image processing, the process 1300 (at 1330) specifies an image correction operation based on the location of the selected face. In the examples of FIGS. 1, 4 and 5, the specified image correction operation is an exposure correction applied to the selected face. Therefore, in some embodiments the image correction operation is applied to the area of the frame where the selected face is located. In other embodiments, the specified image correction operation is a type of image processing that is instead applied to areas of the frame other than the face. For example, the background of the frame can undergo image processing in some embodiments.

Although the process 1300 specifies the image correction at 1330 in some embodiments, the process 1300 in other embodiments instead specifies the image correction operation after selecting all of the desired faces for image processing. In particular, in an example where the image correction operation is one that performs image processing on the background of the frame, the process 1300 can specify the image correction by assessing the locations of all of the selected faces in the frame. Therefore, based on the type of image processing that is applied, the process 1300 can determine when to specify the image correction operation for the selected faces. Alternatively, as further described below, the process 1300 in other embodiments can perform the image processing operation at 1330 instead of at 1340.

After 1330, the process 1300 determines (at 1335) whether any more faces are found in the frame. If so, the process 1300 repeats the subsequent operations by returning to 1315 to select the next face in the frame and determine whether to specify the image correction operation based on the location of this next face. These subsequent operations are repeated until no more faces are found in the frame. For the example of FIG. 4 with multiple detected faces, the process 1300 would repeat these subsequent operations for the second face in the frame.

After no more faces are found in the selected frame, the process 1300 (at 1340) performs the image correction operation previously specified at 1330 of each selected face for image processing. As mentioned before, the image correction operation can include a set of image processing operations that are applied to the area of the face in the frame. Alternatively, the image correction operation of other embodiments can include a set of image processing operations that are applied to the area outside of the face.

After 1340, the process 1300 determines (at 1345) whether more frames are selected for processing. If so, the process 1300 returns to 1305 to select the next selected frame for processing. One example of this is illustrated in FIG. 2 where the ith frame is selected for automatic face detection and image correction. After no more frames are selected for processing at 1345, the process 1300 ends.

The specific operations of the process 1300 described above may not be performed in the exact order shown and described. For instance, although the process 1300 performs the image correction operation at 1340 after detecting all faces selected for image processing, in other embodiments, the process 1300 performs the image correction operation after determining at 1320 whether the selected face is designated for image processing. Furthermore, in some embodiments, the process 1300 can perform the image correction operation after processing all of the selected frames after 1345 instead of after each frame at 1340. Therefore, the process 1300 in these embodiments applies image processing to all of the selected frames after 1345.

Additionally, for the image correction operation applied based on the location of the selected face(s), the process 1300 can also use a smoothing technique for the image correction operation applied to the selected face(s) so that the motion of the face is not jittery from frame to frame. For example, after the process 1300 has the position data of the selected face(s) for each selected frame (e.g., after 1345), the process 1300 can (1) analyze the respective positions of the face(s) from frame to frame to determine a temporal path that represents the motion of the face(s), and (2) apply the smoothing technique to the path formed from the position data. Therefore, the motion of the face throughout the selected frames will not be as jittery in comparison to the motion of the face had the smoothing technique not been performed. Moreover, some embodiments use a modifiable smoothing parameter to customize the amount of smoothing that is applied to the position data.

Figure 13:
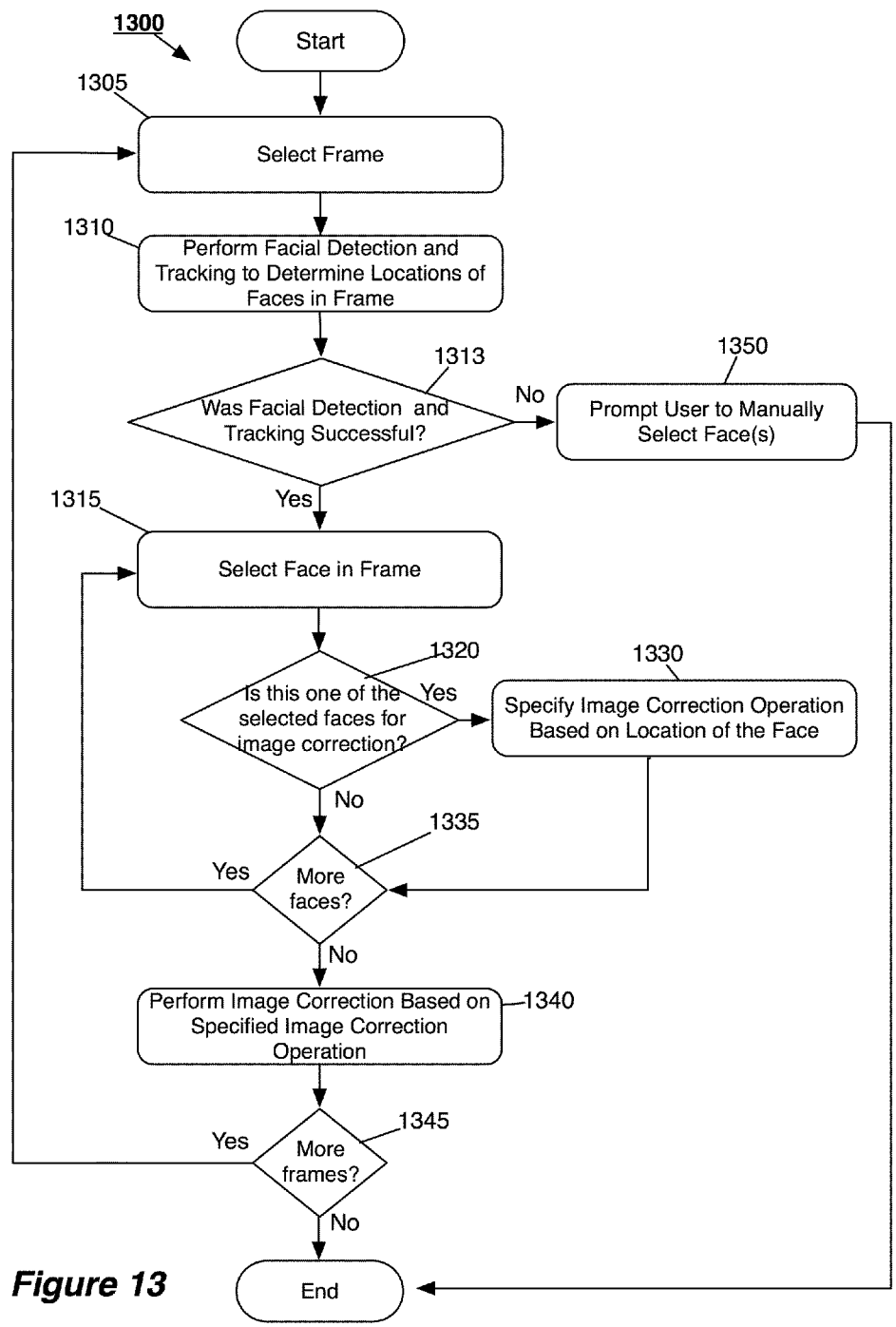
FIG. 13 conceptually illustrates an automated process of some embodiments that examines several or all of the frames of video content, attempts to detect faces in the examined frames, and performs image processing based on the location of the detected faces.

Some such embodiments perform only a subset of operations illustrated in FIG. 13. For instance, such embodiments do not perform operations 1313 and 1350. As another example, some embodiments omit operation 1320 and proceed directly to operation 1330 from operation 1315. Accordingly, different embodiments may perform different sets of operations illustrated in FIG. 13 when using face detection to find faces.

III. Image Processing Examples

As described above, different embodiments provide different sets of image processing operations that can be applied to an image based on the location of the face(s) detectd and/or identified in the image. Examples of several such image processing operations will now be further described by reference to FIGS. 15-19. Although a number of different examples of image processing are described in the following sections below, one of ordinary skill in the art will understand that other types of image processing could be applied and still be within the scope of the invention. Therefore, the following examples are not to be viewed as limiting the scope of the invention. Before the image processing examples are described, an example UI of the image-processing tool is discussed. The UI of the image-processing tool described below is used to apply the examples of image processing in some embodiments.

A. UI Controls for Selecting Image Processing Operations

The image-processing tool of some embodiments was described above in the examples shown in FIGS. 1, 4 and 5. However, the image-processing tool UI illustrated in preceding figures was depicted in a more simplified form so that the description was not obscured with extraneous details. A more detailed description of an example GUI of the image-processing tool is provided as follows.

Figure 14:
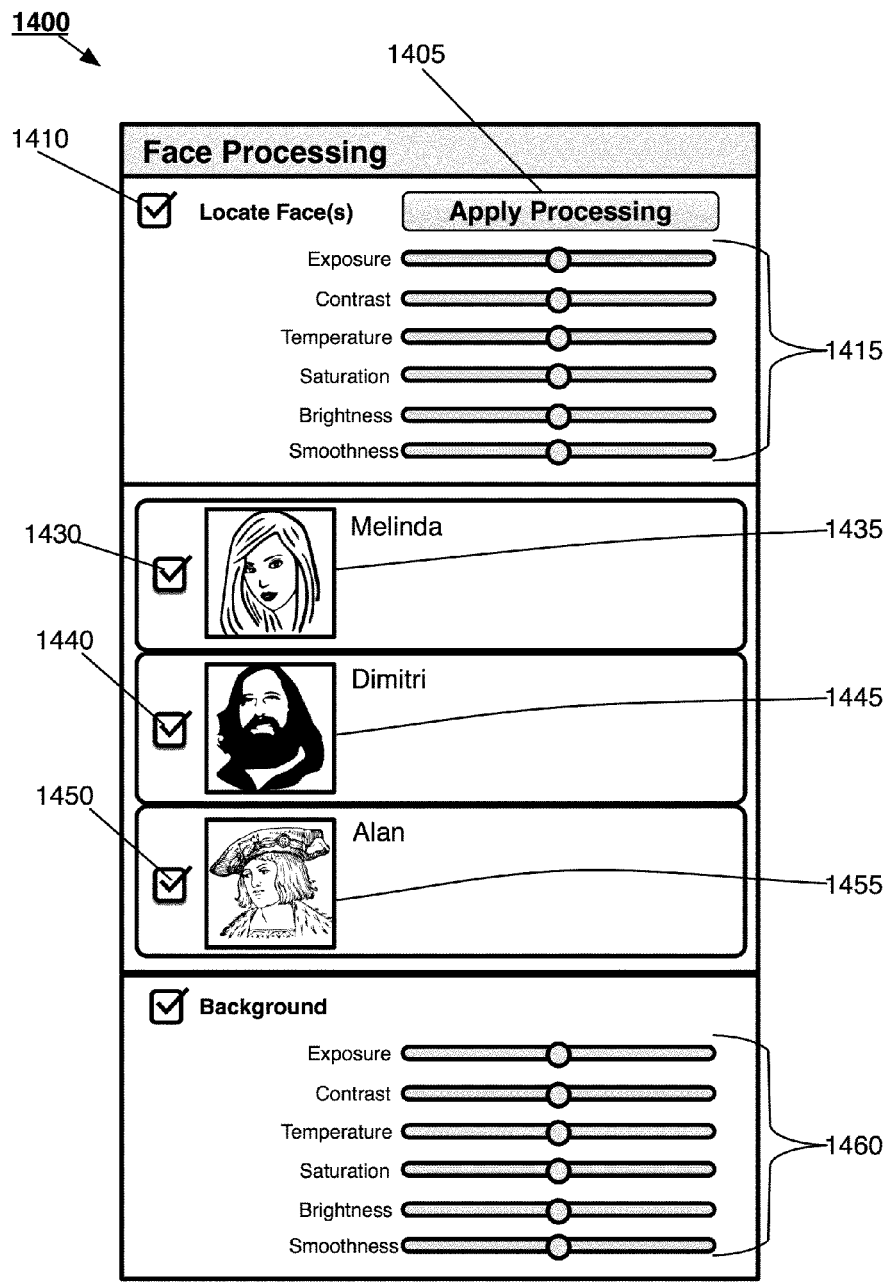
FIG. 14 illustrates an example GUI display for a face-based image-processing tool of some embodiments.

FIG. 14 illustrates an example GUI display for a face-based image-processing tool of some embodiments. The GUI display 1400 shown in FIG. 14 may only show a portion of the GUI display 1400 of some embodiments. For example, in some cases the GUI display 1400 may include additional user interface elements that include additional functionalities and/or features that the user can select. Furthermore, in some embodiments, the illustrated GUI display 1400 can be part of a larger GUI display that has additional functional features. Alternatively, the GUI display 1400 of other embodiments can include fewer UI elements to implement features of the image-processing tool. Lastly, the GUI display 1400 can be presented in a pull-down or drop-down menu or in a pop-up window.

As described before in the examples of FIGS. 1, 4 and 5, the image-processing tool UI is presented in some embodiments after the user has selected the selection item for activating the tool. As shown in FIG. 14, the GUI display 1400 of some embodiments includes a user-selectable checkbox UI item 1410 for indicating that face detection has been performed, a user-selectable button 1405 ("Apply Processing") for performing image processing, and a set of user-selectable slider control items 1415 for adjusting respective image correction parameters. A user can manipulate these portions of the GUI display 1400 to control aspects of the image-processing tool as described in further detail below.

In some embodiments, the GUI display 1400 displays checkbox UI item 1410 after a particular set of faces has been detected for a particular frame using a face detection technique and the particular set of faces are identified to belong to specific individuals by a face recognition technique. After identifying the particular set of faces in the frame, the GUI display 1400 of this example displays a set of faces 1435, 1445, and 1455 respectively corresponding to checkbox UI items 1430, 1440, and 1450 that indicate which faces are designated for image processing. The faces 1435, 1445, and 1455 as shown in GUI display 1400 are thumbnail images that correspond to detected and/or identified faces from the frame. In some embodiments, the GUI display 1400 also displays the names of the identified faces (e.g., "Melinda," "Dimitri," and "Alan") by retrieving different names associated with the identified faces from a database of names (e.g., from face registry entries) that are respectively associated with faces.

The GUI display 1400 of this example displays the checkbox UI items 1430, 1440, and 1450 of the faces 1435, 1445, and 1455 as being selected for image processing by their respective checkmarks. In some embodiments, the user can then select any of the checkbox UI items 1430, 1440, and 1450 to exclude a particular face from image processing. In other embodiments, the GUI display 1400 can display the checkbox UI items 1430, 1440, and 1450 without respective checkmarks after the set of faces are identified in the frame. The user, in this case, can select any of the checkbox UI items 1430, 1440, and 1450 to designate the corresponding face for image processing.

Additionally, the user can select any of the set of user-selectable slider control UI items 1415 to adjust the image correction parameters applied to the designated set of faces. As shown in the example of FIG. 14, the GUI display 1400 displays user-selectable slider control UI items corresponding to image processing operations such as, but not limited to modifying parameters such as, exposure, contrast, temperature, saturation, brightness, smoothness on the face, and the corresponding set of user-selectable slider control UI items for the background image correction operations. These respective operations will now be described in further detail.

Specifically, the image correction operations of exposure, contrast, temperature, saturation and brightness of some embodiments are types of color correction operations that adjust color attributes of areas of the frame isolated by their respective ellipses. Furthermore, the smoothness operation of some embodiments can be a non-color correction operation that adds, removes or otherwise modifies pixel values of areas isolated by ellipses (e.g., a filtering-based operation such as filtering/smoothing of the skin texture for blemish removal or for other applications, etc.). The background image correction of some embodiments may involve any combination of these color and non-color correction operations. For instance, the background image correction may darken and blur the background of the frame by reducing saturation level and brightness. The background image correction operations are performed to the area of the frame outside of the area isolated by its respective ellipse. Some of these types of image processing operations will be further elaborated in connection with FIGS. 15-19 below.

To apply the image processing operations according to the parameters described above, the user can select the button 1405 to initiate the image processing operations. The tool will then process the selected frame(s) of video content in the manner described above in the examples of the preceding figures.

The following examples describe example image processing operations performed by the face-based image-processing tool. In particular, the operations of saturation, contrast, brightness, exposure, filtering on the face areas, and image processing/correction operations on the background area are further elaborated in the following sections. Although the following examples describe particular image processing operations in the context of a single frame, the image-processing tool can process multiple frames of video content in a similar manner as described before. Moreover, one of ordinary skill in the art would appreciate that other types of image processing operations not described herein could be performed and still be within the scope of the invention. Therefore, these following examples should not be interpreted as limiting the image processing capabilities of the face-based image-processing tool.

B. Bringing Focus to a Face

Figure 15:
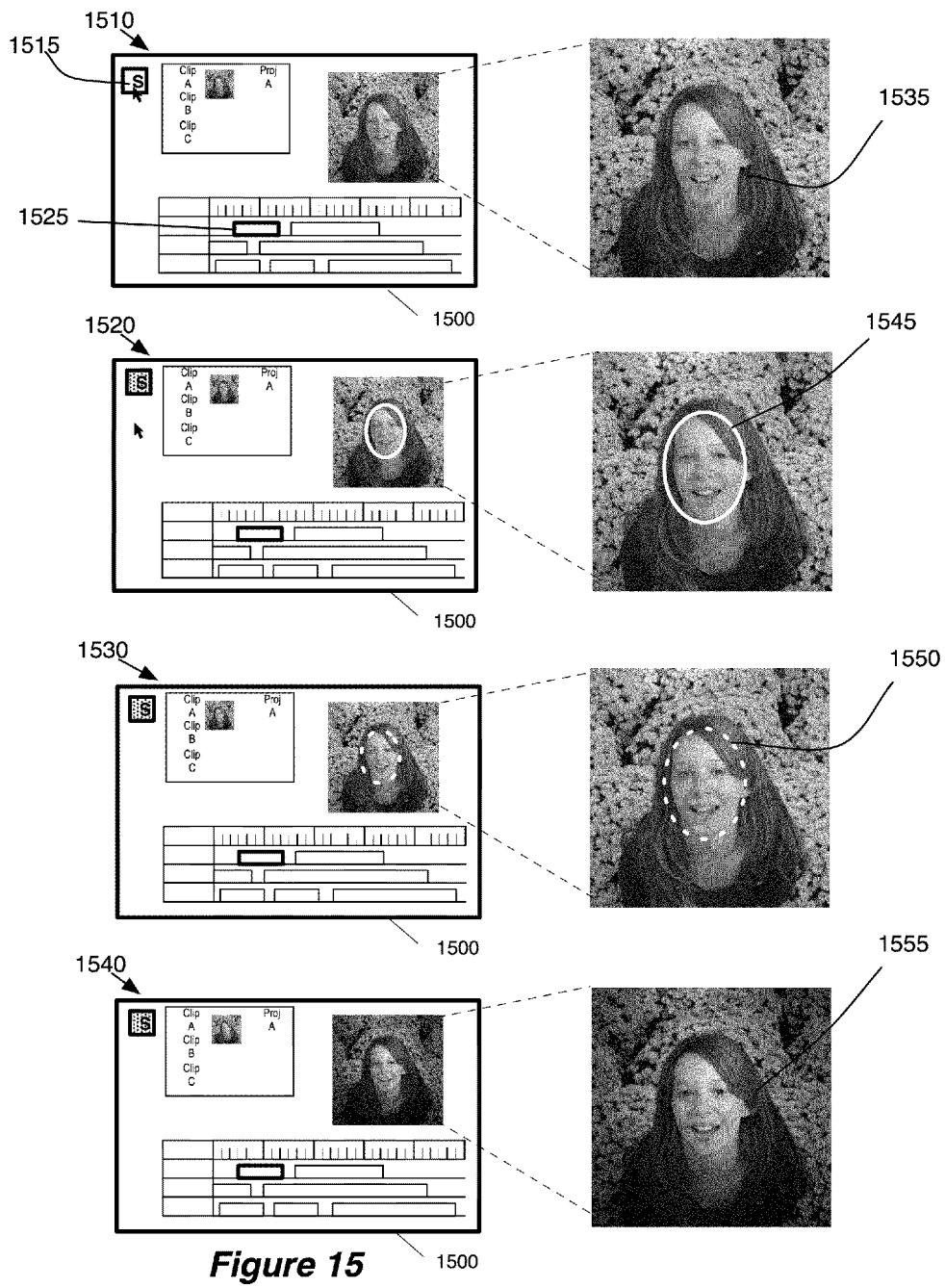
FIG. 15 illustrates an example combination of color correction operations to make a face in the image to stand out.

The image-processing tool described above can apply different combinations of image correction operations on the areas of the frame isolated by their respective ellipses and the areas outside the ellipses. FIG. 15 illustrates an example combination of color correction operations to enhance a face and make it stand out in the image (i.e., to bring focus to the face). FIG. 15 illustrates a GUI 1500 of a media-editing application for adjusting saturation, contrast, and brightness in a face in a selected frame and the background in some embodiments. The GUI 1500 in this figure is the same GUI described above by reference to FIG. 1.

Specifically, FIG. 15 illustrates four different stages 1510-1540 of the GUI 1500 for automatically detecting a face and increasing saturation and contrast in the face while decreasing saturation and luminance in the background of the selected image. Saturation can be understood as the purity of color for the area of the frame including the face. A pure color is defined as any combination of two primary colors (e.g., red, green, and blue). A color will lose purity and become desaturated when it is diluted with gray.

The first stage 1510 illustrates the selection of a media clip 1525 including video content for color correction. In this example, the GUI 1500 displays the face 1535 in a selected frame from the media clip 1525. The face 1535 in this example is not vibrant in color and requires the saturation adjustment operation. Also, the face 1535 has brightness that is relatively uniform over the entire face. Moreover, the face 1535's brightness is nearly the same as that of the background, causing the face not to stand out in the frame. The flowers shown in the background in this example have relatively vibrant colors, making the face not visually prominent in the frame.

The user can then select a face-based image-processing item 1515 to automatically identify the face 1535 in the frame and automatically apply different combinations of color correction operations. As described before, the face-based image-processing item 1515 is a conceptual illustration of one or more UI items that allow the media-editing application to activate its face-based image-processing tool.

After activating the image-processing tool, the image-processing tool of some embodiments identifies the face 1535 in the first stage 1510 and can then present to the user a similar GUI display (not shown) as one described in FIG. 14 with the face 1535 automatically designated for image processing. The user can then adjust the slider control UI items corresponding to the saturation and contrast operations (such as ones shown in FIG. 14). In some embodiments, the user can move the slider controls to the right to increase the amount of saturation and contrast that will be applied to the face 1535. The user can also adjust one or more slider control UI items corresponding to the background correction operations (such as one shown as "background" in FIG. 14). In some embodiments, the user moves the slider control to the left to decrease the brightness and saturation of the other areas in the frame other than the face 1535.

The user then selects the selectable button in the GUI display (such as button 1405 from the GUI display 1400) to perform the color correction on the face 1535 and the background. However, in other embodiments, such a GUI display is not presented to the user and the image-processing tool automatically designates the detected and/or identified face 1535 for the contrast and saturation correction operations and automatically determines an amount of contrast and saturation to apply to the face 1535. Similarly, the image-processing tool of these embodiments automatically designates the identified face 1535 for the background correction operation and automatically determines an amount of brightness and saturation to decrease for the outside areas.

The second stage 1520 shows an ellipse 1545 that has been generated by the image-processing tool. The image-processing tool can generate the ellipse 1545 based on the geometric properties of the detected and/or identified face as described above. The ellipse 1545 encompasses the area of the frame that includes the face 1535 and isolates that area for image processing.

Next, the third stage 1530 illustrates an elliptical halo region 1550 shown as a dashed ellipse. This region is similar to the region 160 of FIG. 1 and it is produced for the same reason, i.e., to provide for a gradual transition of the image processing that is applied to the identified face and the outside of the identified face. Also, like the third stage 130 of FIG. 1, the third stage 1530 is not a stage that is shown to the user in some embodiments, but rather is a representation of a calculation that is performed by the tool in some embodiments to smoothen the transition of the image processing.

Finally, the fourth stage 1540 depicts the GUI 1500 after the image-processing tool has applied the color correction to the area isolated by the ellipse and the outside area from the ellipse. As shown in the example, the face 1555 represents a saturation and contrast corrected version of the face 1535 from the previous stages. Different embodiments of the invention modify the saturation of the face differently. Several techniques for modifying the saturation of the face are described in the U.S. Patent Publication 2009/0201310. The GUI 1500 also displays the outside areas as darker and less focused than the face. Also, the face 1555 appears more visible in the frame due to the increase in saturation and contrast.

C. Correcting the Exposure of a Face

The image-processing tool described above can apply an exposure operation for any face found in a particular frame to adjust the exposure of the face. Exposure represents an amount of light in the frame and an adjustment to the exposure affects the overall brightness of the frame as well as the perceived contrast of the frame. In some instances, the exposure of the frame can obscure the visibility of the face in the frame. Therefore, correcting the exposure in the area of the face isolated by its ellipse can be required in these instances.

Figure 16:
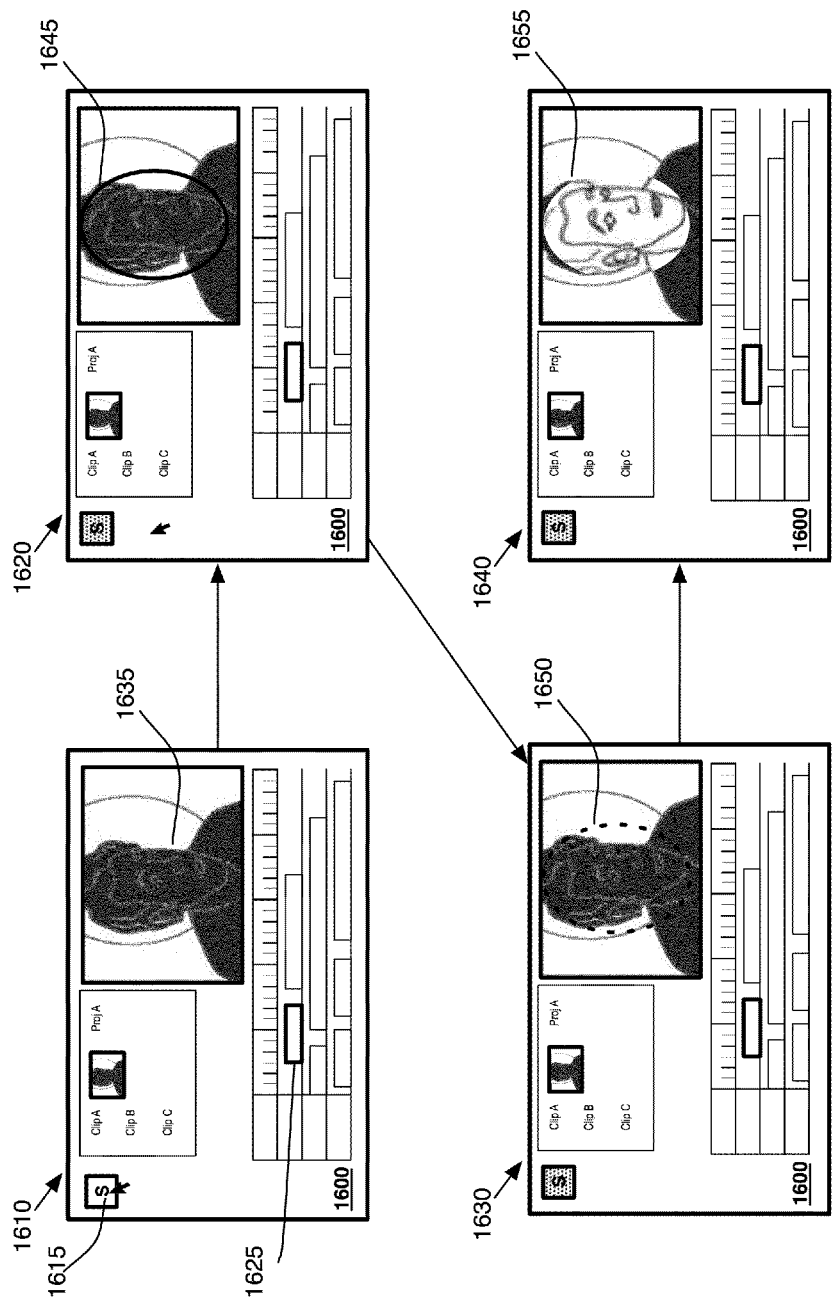
FIG. 16 illustrates a GUI of a media-editing application for adjusting the exposure of the face in a selected frame of some embodiments.

FIG. 16 illustrates a GUI 1600 of a media-editing application for adjusting the exposure of the face in a selected frame of some embodiments. The GUI 1600 in this figure is similar to GUI 100 described above by reference to FIG. 1. Specifically, FIG. 16 illustrates four different stages 1610-1640 of the GUI 1600 for automatically detecting a face and applying the exposure correction to the face.

The first stage 1610 illustrates the selection of a media clip 1625 containing video content for exposure correction. In this example, the GUI 1600 displays the face 1635 in a selected frame from the media clip 1625. As shown in FIG. 16, the face 1635 is underexposed and requires an exposure correction to better visually highlight the area surrounding the face 1635.

The user can then select a face-based image-processing item 1615 to automatically identify the face 1635 in the frame and automatically apply the exposure correction to the face 1635. As described above, the face-based image-processing item 1615 is a conceptual illustration of one or more UI items that allow the media-editing application to activate its face-based image-processing tool.

After activating the image-processing tool, the image-processing tool of some embodiments identifies the face 1635 in the first stage 1610 and can then present to the user a similar GUI display (not shown) as one described in FIG. 14 with the face 1635 automatically designated for image processing. The user can then adjust the slider control UI item corresponding to the exposure operation (such as one shown in FIG. 14). In some embodiments, the user can move the slider control to the right to increase the amount of exposure that will be applied to the face 1635. The user then selects the selectable button in the GUI display (such as button 1405 from the GUI display 1400) to perform the exposure correction on the face 1635. However, in other embodiments, such a GUI display is not presented to the user and the image-processing tool automatically designates the identified face 1635 for the exposure correction operation and automatically determines an amount of exposure to apply to the face 1635.

The second stage 1620 shows an ellipse 1645 that has been generated by the image-processing tool. The image-processing tool can generate the ellipse 1645 based on the geometric properties of the identified face as described before. The ellipse 1645 encompasses the area of the frame including the face 1635 and isolates that area for image processing.

Next, the third stage 1630 illustrates an elliptical halo region 1650 shown as a dashed ellipse. This region is similar to the region 160 of FIG. 1 and it is produced for the same reason, i.e., to provide for a gradual transition of the image processing that is applied to the identified face. Also, like the third stage 130 of FIG. 1, the third stage 1630 is not a stage that is shown to the user in some embodiments, but rather is a representation of a calculation that is performed by the tool in some embodiments to smoothen the transition of the image processing.

Finally, the fourth stage 1640 depicts the GUI 1600 after the image-processing tool has applied the exposure correction to the area isolated by the ellipse. As shown in the example, the face 1655 represents an exposure corrected version of the face 1635 from the previous stages. In particular, the face 1655 appears more visible in the frame due to the increase in exposure.

In some embodiments, the image-processing tool modifies the pixel data of the identified face by using the following function for the exposure correction:

Pout(x,y)=Pin(x,y)*exposure, where Pin is the pixel data before the exposure correction, exposure is value of the exposure correction and Pout is the pixel data after the exposure correction.

D. Correcting the Saturation of a Face

The image-processing tool can also adjust the saturation level of the face in a frame. In the following example, image-processing tool of some embodiments performs a saturation adjustment operation in the area around the face that is isolated by the ellipse. In some instances, the skin tone of the face is too dull or not sufficiently vibrant. Therefore, the image-processing tool is used to adjust the saturation of the face to enhance the skin tones of the face.

Figure 17:
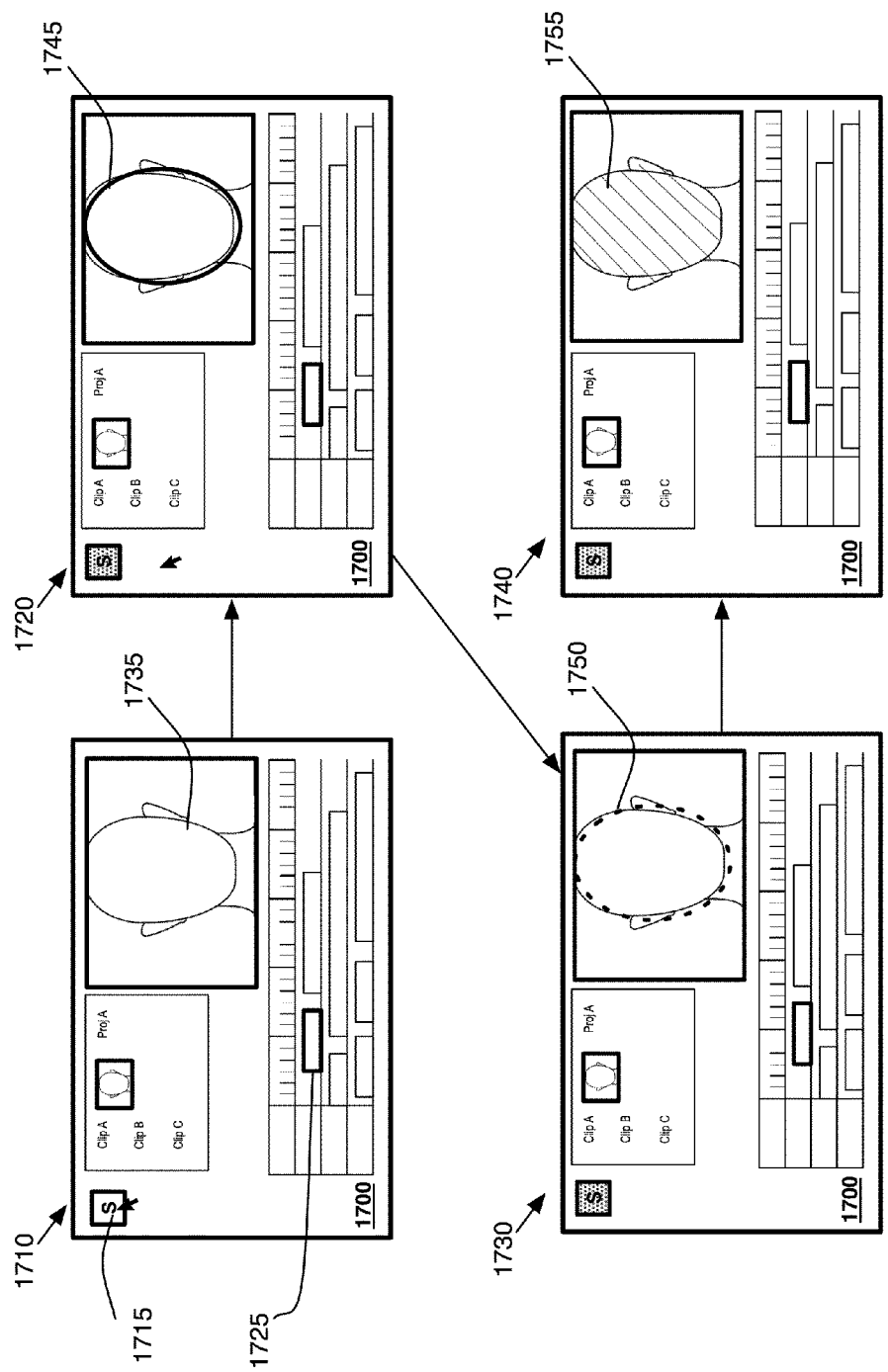
FIG. 17 illustrates a GUI of a media-editing application for adjusting the saturation on the face in a selected frame of some embodiments.

FIG. 17 illustrates a GUI 1700 of a media-editing application for adjusting the saturation on the face in a selected frame of some embodiments. The GUI 1700 in this figure is the same GUI as described above by reference to FIG. 1. Specifically, FIG. 17 illustrates four different stages 1710-1740 of the GUI 1700 for automatically detecting a face and applying the saturation adjustment operation to the face.

As shown in the example, the first stage 1710 shows the selection of a media clip 1725 containing video content for saturation adjustment. The GUI 1700 displays the face 1735 in a selected frame from the media clip 1725. In this example, the face 1735 is a conceptually illustration of a face that is not vibrant in color and requires the saturation adjustment operation.

The first stage 1710 further illustrates the selection of a face-based image-processing item 1715 to automatically detect the face 1735 and to apply the saturation adjustment operation to the face 1735. As described before, the face-based image-processing item 1715 of some embodiments is a conceptual illustration of one or more UI items that allow the media-editing application to activate its face-based image-processing tool.

After activating the image-processing tool, the image-processing tool of some embodiments identifies the face 1735 in the first stage 1710 and can then present to the user a similar GUI display (not shown) as one described in FIG. 14 with the face 1735 automatically designated for image processing. The user can then adjust the slider control UI item corresponding to the saturation adjustment operation (such as one shown as "saturation" in FIG. 14). In some embodiments, the user moves the slider control to the right to increase the amount of saturation applied to the face 1735.

The user then selects the selectable button in the GUI display (such as button 1405 from the GUI display 1400) to perform the saturation adjustment operation on the face 1735. However, in other embodiments, such a GUI display is not presented to the user and the image-processing tool automatically designates the identified face 1735 for the saturation adjustment operation and automatically determines an amount of saturation to apply to the face 1735.

The second stage 1720 shows an ellipse 1745 that has been generated by image-processing tool. The image-processing tool can generate the ellipse 1745 based on the geometric properties of the identified face as mentioned before. As shown, the ellipse 1745 encompasses the area of the frame including the face 1735 and isolates that area for image processing.

Next, the third stage 1730 illustrates an elliptical halo region 1750 shown as a dashed ellipse. This region is similar to the region 160 of FIG. 1 and it is produced for the same reason, i.e., to provide for a gradual transition of the image processing that is applied to the identified face. Also, like the third stage 130 of FIG. 1, the third stage 1730 is not a stage that is shown to the user in some embodiments, but rather is a representation of a calculation that is performed by the tool in some embodiments to smoothen the transition of the image processing.

The fourth stage 1740 depicts the GUI 1700 after the image-processing tool has applied the saturation adjustment operation to the area isolated by the ellipse. As shown in this example, the GUI 1700 conceptually displays the face 1755 with a greater saturation level as a series of parallel oblique lines in comparison with the face from the previous stages. Different embodiments of the invention modify the saturation of the face differently. Several techniques for modifying the saturation of the face are described in the U.S. Patent Publication 2009/0201310.

E. Removing Blemishes in a Face

In addition, the image-processing tool described above performs a non-color based correction for any face found in a particular frame in some embodiments. Although in some embodiments it may involve color based correction, blemish removal is an example that can be accomplished through non-color based correction. The image-processing tool of some embodiments performs blemish removal to remove the appearance of aesthetically displeasing features such as wrinkles, freckles, moles, skin spots, or the likes from the face by applying image processing that softens the appearance of the skin texture of the face.

Figure 18:
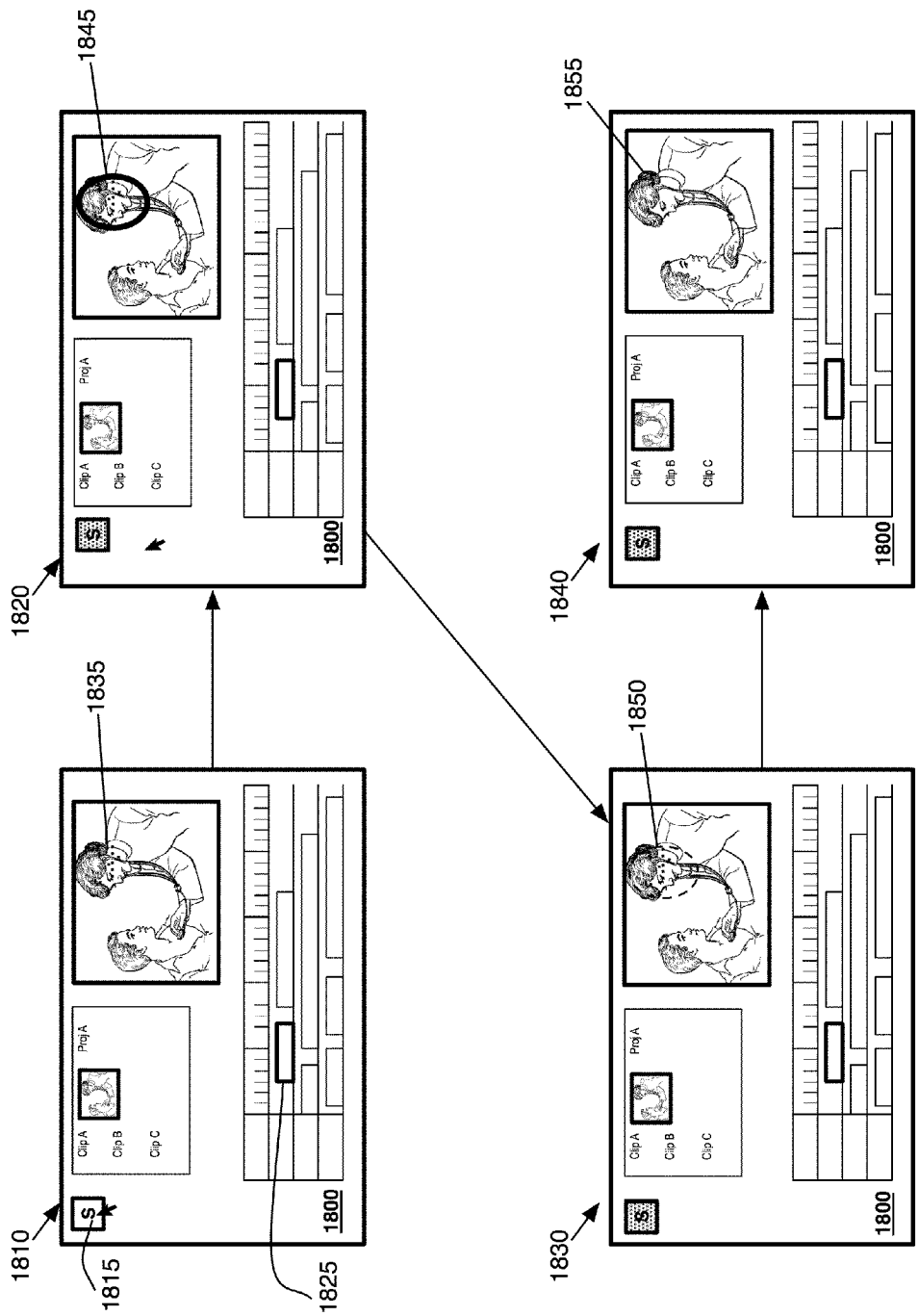
FIG. 18 illustrates a GUI of a media-editing application for performing the blemish removal operation on the face in a selected frame of some embodiments.

FIG. 18 illustrates a GUI 1800 of a media-editing application for performing the blemish removal operation on the face in a selected frame of some embodiments. The GUI 1800 in this figure is the same GUI as described above by reference to FIG. 1. Specifically, FIG. 18 illustrates four different stages 1810-1840 of the GUI 1800 for automatically detecting a face and applying the blemish removal operation to the face.

As shown in the example, the first stage 1810 shows the selection of a media clip 1825 containing video content for blemish removal. The GUI 1800 displays the face 1835 in a selected frame from the media clip 1825. In this example, the face 1835 includes blemishes that can be removed using the tool.

The user then selects a face-based image-processing item 1815 to automatically select the face 1835 and to apply the blemish removal operation to the face 1835. As described before, the face-based image-processing item 1815 is a conceptual illustration of one or more UI items that allow the media-editing application to activate its face-based image-processing tool.

After activating the image-processing tool, the image-processing tool of some embodiments identifies the face 1835 in the first stage 1810 and can then present to the user a similar GUI display (not shown) as one described in FIG. 14 with the face 1835 automatically designated for image processing. In this example, the image-processing tool can detect two different faces in the frame in the first stage 1810. Therefore, the user can deselect the corresponding checkbox UI item of the face shown in the GUI display that will not require blemish removal. The user can then adjust the slider control UI item corresponding to the blemish removal operation (such as one shown as "smoothness" in FIG. 14). In some embodiments, the user moves the slider control to the left to decrease the amount of skin detail to smooth the texture of the skin in face 1835. The user then selects the selectable button in the GUI display (such as button 1405 from the GUI display 1400) to perform the blemish removal operation on the face 1835. However, in other embodiments, such a GUI display is not presented to the user and the image-processing tool automatically designates the detected face 1835 for the blemish removal operation and automatically determines an amount of blemish removal to apply to the face 1835.

The second stage 1820 illustrates an ellipse 1845 that has been generated by the image-processing tool. The image-processing tool can generate the ellipse 1845 based on the geometric properties of the detected face as described previously. The ellipse 1845 encompasses the area of the frame including the face 1835 and isolates that area for image processing.

Next, the third stage 1830 illustrates an elliptical halo region 1850 shown as a dashed ellipse. This region is similar to the region 160 of FIG. 1 and it is produced for the same reason, i.e., to provide for a gradual transition of the image processing that is applied to the detected face. Also, like the third stage 130 of FIG. 1, the third stage 1830 is not a stage that is shown to the user in some embodiments, but rather is a representation of a calculation that is performed by the tool in some embodiments to smoothen the transition of the image processing.

The fourth stage 1840 depicts the GUI 1800 after the tool has applied the blemish removal operation to the area isolated by the ellipse. As shown in this example, the GUI 1800 displays the face 1855 without the blemishes from the previous stages. Different embodiments employ different techniques to remove blemishes. One such technique is described in the U.S. Patent Publication 2009/0202170, now issued as U.S. Pat. No. 8.385,681.

F. Correcting the Background of a Face

Instead of or in conjunction with applying an image processing operations to an area of the frame isolated by the ellipse as described in the previous examples, the image-processing tool can apply image processing to the areas outside of the ellipse. Specifically, image-processing tool can perform a background correction operation that darken and blurs these outside areas to correct for other image defects and/or increase the visual prominence of the face in the frame.

Figure 19:
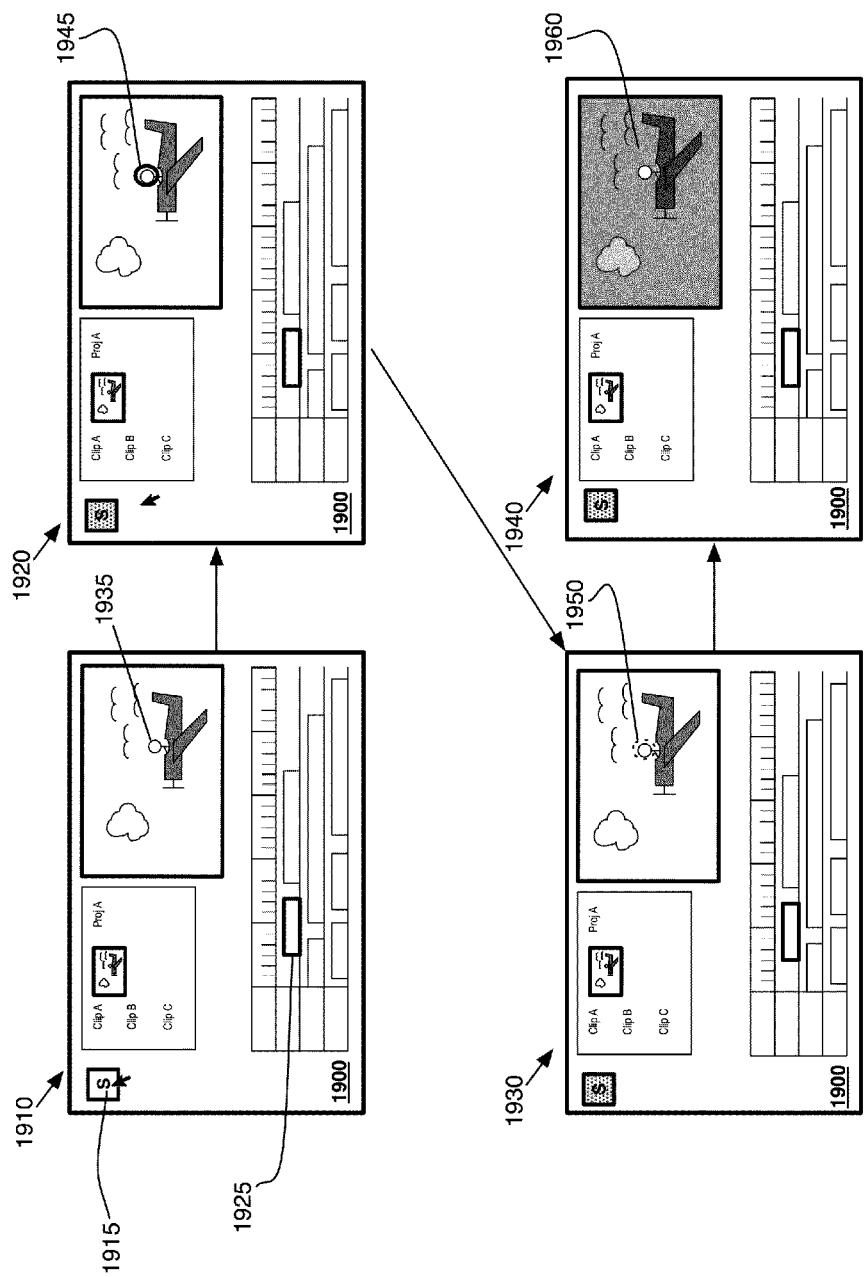
FIG. 19 illustrates a GUI of a media-editing application for performing the background correction on a selected frame of some embodiments.

FIG. 19 illustrates a GUI 1900 of a media-editing application for performing the background correction on a selected frame of some embodiments. The GUI 1900 in this figure is the same GUI as described above by reference to FIG. 1. In particular, FIG. 19 illustrates four different stages 1910-1940 of the GUI 1900 for automatically detecting a face and applying the background correction to the areas outside of the face.

As illustrated in this example, the first stage 1910 shows the selection of a media clip 1925 containing video content for background correction. The GUI 1900 displays the face 1935 in a selected frame from the media clip 1925. In this example, the face 1935 is included in a scene depicted in the selected frame that is not as visually prominent because the background is very bright. Therefore, the background correction operation can be performed to darken and blur the background in the selected frame.

The first stage 1910 further shows the selection of a face-based image-processing item 1915 to automatically detect the face 1935 and to apply the background correction operation to the areas outside of the face 1935. As described before, the face-based image-processing item 1915 is a conceptual illustration of one or more UI items that allow the media-editing application to activate its face-based image-processing tool.

After activating the image-processing tool, the image-processing tool of some embodiments detects the face 1935 in the first stage 1910 and can then present to the user a similar GUI display (not shown) as one described in FIG. 14 with the face 1935 automatically designated for image processing. The user can then adjust the slider control UI items corresponding to the background correction operation (such as items 1460 shown in FIG. 14). In some embodiments, the user moves the slider control to the left to decrease the brightness and sharpness of the outside areas from the face 1935. The user then selects the selectable button in the GUI display (such as button 1405 from the GUI display 1400) to perform the background correction operation on the face 1935. However, in other embodiments, such a GUI display is not presented to the user and the image-processing tool automatically designates the detected face 1935 for the background correction operation and automatically determines an amount to dark and blur the outside areas from the face 1935.

The second stage 1920 illustrates an ellipse 1945 that has been generated by image-processing tool. The image-processing tool can generate the ellipse 1945 based on the geometric properties of the detected face as described before. As shown, the ellipse 1945 encompasses the area of the frame including the face 1935. In this example, instead of isolating the area for image processing, the ellipse 1945 excludes the area of the frame for the background correction operation.

Next, the third stage 1930 illustrates an elliptical halo region 1950 shown as a dashed ellipse. This region is similar to the region 160 of FIG. 1 and it is produced for the same reason, i.e., to provide for a gradual transition of the image processing that is applied outside of the detected face. Also, like the third stage 130 of FIG. 1, the third stage 1730 is not a stage that is shown to the user in some embodiments, but rather is a representation of a calculation that is performed by the tool in some embodiments to smoothen the transition of the image processing.

Finally, the fourth stage 1940 depicts the GUI 1900 after image-processing tool has applied the background correction operation to the outside areas 1960 from the ellipse. As shown in this example, the GUI 1900 displays the outside areas 1960 as darker and less focused than the face.

Although the examples described above in FIGS. 16-19 illustrate different stages for a selected frame from a selected media clip, the operations described above for each of these figures can be automatically performed for any remaining subsequent frames from the selected media clip so that the user is not required to manually step through each subsequent frame to select and designate the faces for image processing or select image processing operation. In this fashion, the image-processing tool processes more than one frame and can process the entirety of the frames from the selected media clip in an automated manner.

IV. Face Recognition

Some of the embodiments that have been described so far utilize face detection techniques to find faces in frames. However, as mentioned above, some embodiments of the invention may utilize face recognition techniques to identify faces. A face detection technique is a technique that attempts to find any (typically human) faces in the frames. On the other hand, a face recognition technique is a technique to identify the owner of a face in a frame (i.e., to recognize whose face the face found in the frame is). In other words, the face recognition technique looks for particular face(s) in the frames. Some known face recognition techniques that some embodiments may utilize include Eigenfaces, Neural Networks, Fisher Faces, or a combination thereof.

Different embodiments use different combination of face detection techniques and face recognition techniques in order to apply a set of image processing operations on the faces located in the frames of an image sequence. For instance, some embodiments use a face detection technique to detect faces in each frame of an image sequence and then track faces in the frames to apply a set of image processing operations. To track the detected faces, these embodiments can use face registry technique (such as those mentioned earlier) that are part of the face detection technique, or they can use separate tracking techniques in addition to the face detection techniques, to apply the set of image processing operations to the faces selected or designated for processing. In contrast, other embodiments utilize a face recognition technique to identify one or more faces in a small subset of the frames in the image sequence as belonging to specific individuals, and then track those identified faces in other frames of the image sequence in order to apply the set of image processing operations to those faces. Thus, for these embodiments, a face recognition technique alone is used to locate and track faces in the frames of the image sequence.

Regardless of the combination of face detection and face recognition techniques used, some embodiments generate and update a list of faces that are detected and/or identified in the frames. For each of the faces in the list, some embodiments compute face parameters that include geometric properties of the face, the location of the face and of the face features (such as eyes, nose, mouth, etc.), and other information that can be computed based on these (such as elongation and width of the face, etc.). Also, some embodiments compute a set of facial animation parameters (FAPs) for a face in the list.

V. Software Architecture

Although the above description describes embodiments of the media-editing application, other embodiments of the media-editing application include other editing tools that were not described above for the sake of clarity. Examples of such editing tools may include zoom, color enhancement, blemish removal, audio mixing, trim tools, etc. In addition, the media-editing application can include other media editing functionalities. Such functionalities may include library functions, format conversion functions, etc.

Figure 20:
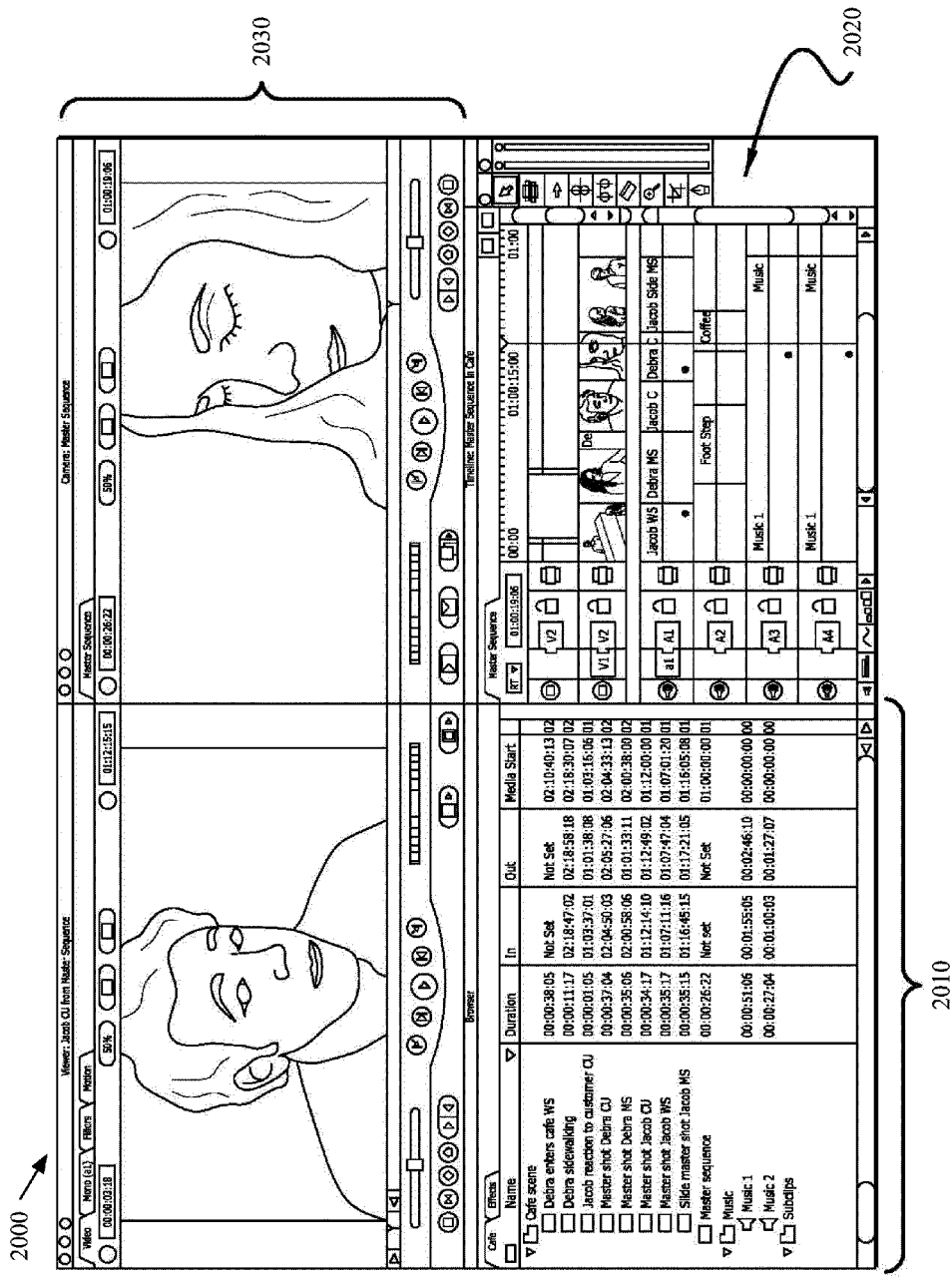
FIG. 20 shows a media editing application of some embodiments.

A more detailed view of a media editing application with these additional features is illustrated in FIG. 20. Specifically, FIG. 20 shows a media editing application with these additional tools. FIG. 20 illustrates a list of video and/or audio clips 2010, video editing tools 2020, and video displays 2030. The list of clips 2010 includes video clips along with data (e.g., time code information) about the video clips. In some embodiments, the list of video clips is the list of video clips in a particular sequence of video clips, and the data specifying in and out points, durations, etc. for the video clips.

The video editing tools 2020 include tools that allow a user to graphically set in and out points for video clips (in other words, where in the final product a specific clip or part of a clip will be shown). The video editing tools 2020 can be used to modify the temporal sequence of the video frame and to synchronize audio tracks with video tracks (e.g., in order to add music over a video clip). In some embodiments, video editing tools 2020 also give users the ability to edit effects or perform other video editing functions. In some embodiments, the video editing tools include trim tools for performing edits such as slide edits, ripple edits, slip edits, roll edits, etc.

The video displays 2030 allow a user to watch multiple video clips at once, thereby enabling easier selection of in and out points for the video clips. The screen shot 2000 illustrates a few of many different editing tools that a video editing application of some embodiments may include to edit digital video.

In some cases, some or all of the video clips that are displayed in the list of clips 2010, played in displays 2030, and edited by a user with video editing tools 2020, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Figure 21:
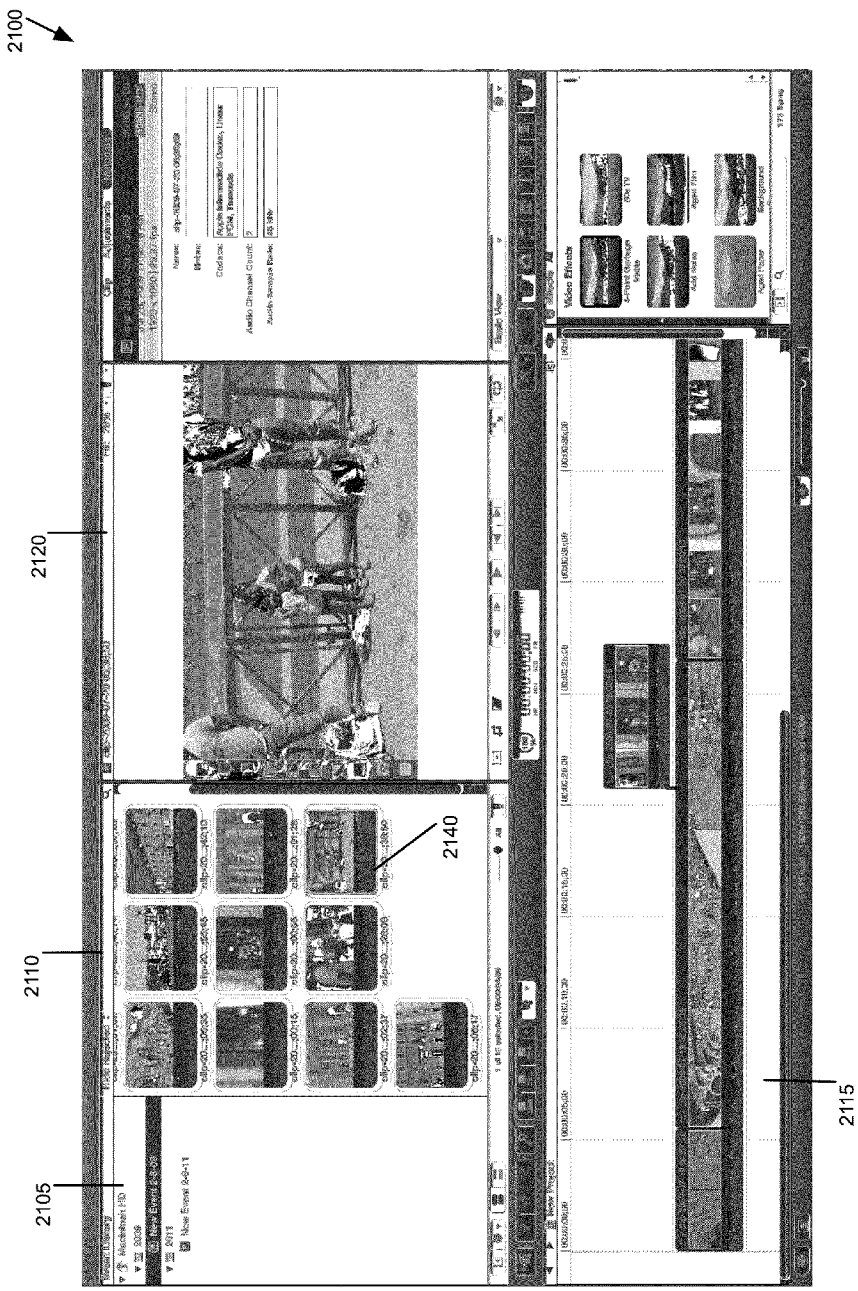
FIG. 21 illustrates a GUI of a media-editing application of some embodiments that does not have tracks in its composite display area.

Another detailed view of a media editing application with the above-mentioned additional features is illustrated in FIG. 21. FIG. 21 illustrates a GUI 2100 of a media-editing application of some embodiments that does not have tracks in its composite display area. One of ordinary skill will recognize that the graphical user interface 2100 is only one of many possible GUIs for such a media-editing application. In fact, the GUI 2100 includes several display areas which may be adjusted in size, opened or closed, replaced with other display areas, etc. The GUI 2100 includes a clip library 2105, a clip browser 2110, a composite display area 2115, and a preview display area 2120.

The clip library 2105 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera).

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc.

The clip browser 2110 allows the user to view clips from a selected folder (e.g., an event, a sub-folder, etc.) of the clip library 2105. As shown in this example, the folder "New Event 2-8-11 3" is selected in the clip library 2105, and the clips belonging to that folder are displayed in the clip browser 2110. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can select a frame of the clip. That is, when the user places the cursor at a particular horizontal location within the thumbnail filmstrip, the media-editing application associates that horizontal location with a time in the associated media file, and displays the frame from the media file for that time.

The composite display area 2115 provides a visual representation of a composite presentation (or project) being created by the user of the media-editing application. Specifically, it displays one or more geometric shapes that represent one or more media clips that are part of the composite presentation. The composite display area 2115 of some embodiments includes a primary lane (also called a "spine", "primary compositing lane", or "central compositing lane") as well as one or more secondary lanes (also called "anchor lanes"). The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The preview display area 2120 (also referred to as a "viewer") displays images from media files that the user is skimming through, playing back, or editing. These images may be from a composite presentation in the composite display area 2115 or from a media clip in the clip browser 2110. In this example, the user has been skimming through the beginning of clip 2140, and therefore an image from the start of this media file is displayed in the preview display area 2120. As shown, some embodiments will display the images as large as possible within the display area while maintaining the aspect ratio of the image.

One or ordinary skill will also recognize that the set of display areas shown in the GUI 2100 is one of many possible configurations for the GUI of some embodiments. For instance, in some embodiments, the presence or absence of many of the display areas can be toggled through the GUI (e.g., the inspector display area 2125, additional media display area 2130, and clip library 2105). In addition, some embodiments allow the user to modify the size of the various display areas within the UI.

Figure 22:
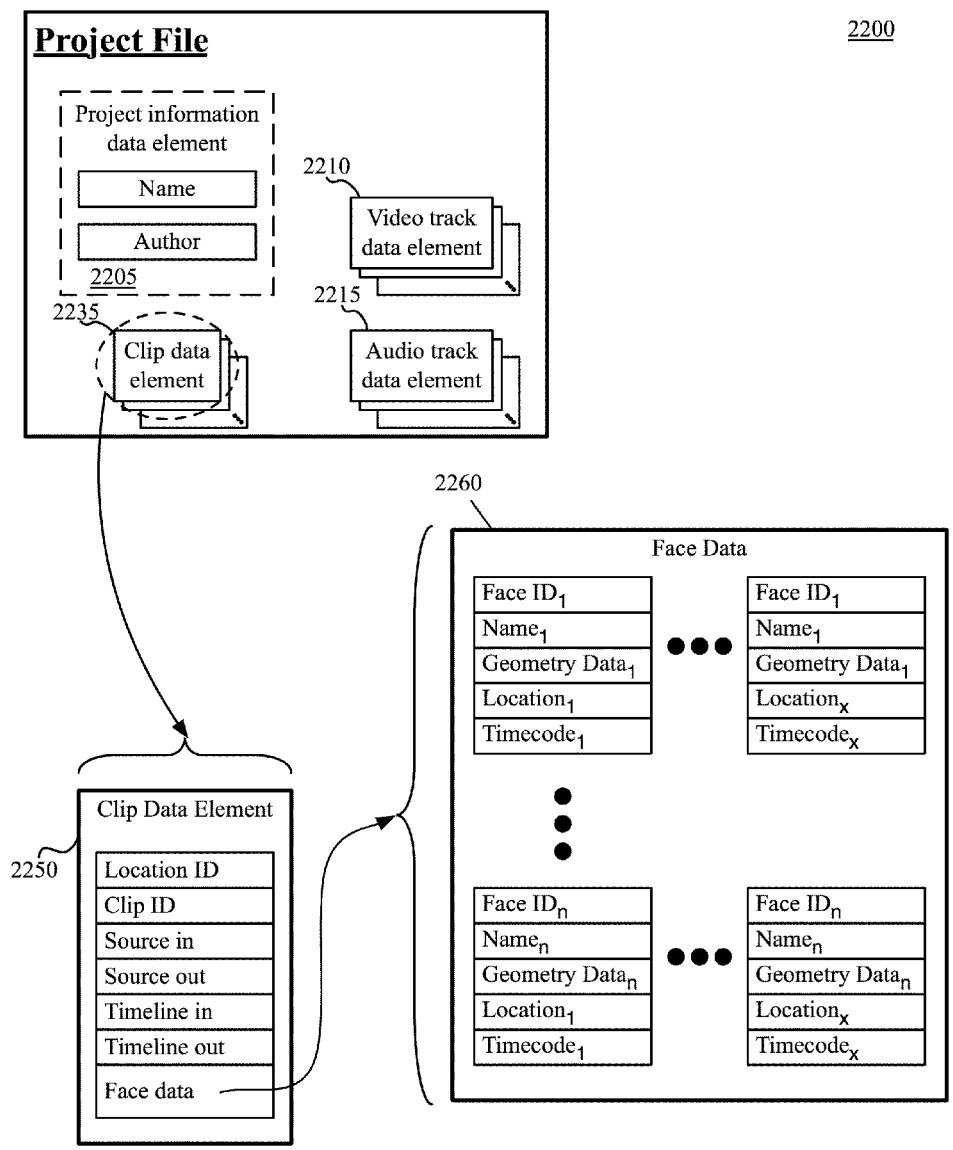
FIG. 22 conceptually illustrates various attributes and data structures that are included in some embodiments of the media editing application's composite project file.

FIG. 22 conceptually illustrates the data structures used by some embodiments to perform at least some of their operations. Specifically, FIG. 22 illustrates various attributes and data structures that can be included in some embodiments of the media editing application's composite project file 2200. As shown, the project file 2200 can include a project information data element 2205. The project information data element can include attributes such as, for example, the project's name, author, etc. Although these attributes are represented as a single data structure, some embodiments can store each of the attributes in a separate data element.

In addition, the project file 2200 can include video track data elements 2210 and audio track data elements 2215 for storing information corresponding to various clips that have been placed in the different tracks for those embodiments of the media-editing application that have a composite display area with tracks. In other embodiments that place media clips in a trackless composite display area, the project file 2200 will not have the track data elements 2210 and the audio track data elements 2215.

A single project can include multiple audio tracks and multiple video tracks. In addition, other types of track data elements can be stored in the project file. For instance, effects track data elements, overlay track data elements, or other types of track data elements can be stored in the project file in addition to audio and video track data elements. In some embodiments each video track data element 2210 includes references to each clip that has been placed in a track (i.e., each clip shown in the composite display area). For each clip that has undergone face detection to detect a set of faces in the clip, the video track data element 2210 refers to an individual clip data element 2235 that is part of the project file 2200. These clip data elements 2235 are shown in more detail in breakout section 2250.

As shown in FIG. 22, each clip data element 2250 can include information such as a set of location identifiers, a set of clip identifiers, source in and out references, timeline in and out references, face data, and/or various other attributes (e.g., color settings, audio settings, effects settings, etc.). One of ordinary skill in the art will recognize that the clip data elements can include other data that is not shown, or can include at least the face data but not include all of the other data shown in the conceptual diagram 2250. The face data is shown in more detail in breakout section 2260. The face data is referred to as "face parameters" in some embodiments described above.

The face data 2260 of some embodiments can include information such as an identifier of a particular face, an associated name, geometric data of the face, a location of the face, and timecode data to associate the face to a particular frame of video content. As shown, the face data 2260 can include data for each detected face from each frame of the clip. The face data 2260 is generated by some embodiments of the invention as described by reference to the processes described in FIGS. 11-10. Further, some embodiments use the face data 2260 to generate the ellipse-shaped masks as described in earlier sections.

One of ordinary skill in the art would understand that the data structures, elements, and attributes described above in reference to FIG. 22 are conceptual representations of the structures, elements, and attributes that can be used to implement some embodiments.

Figure 23:
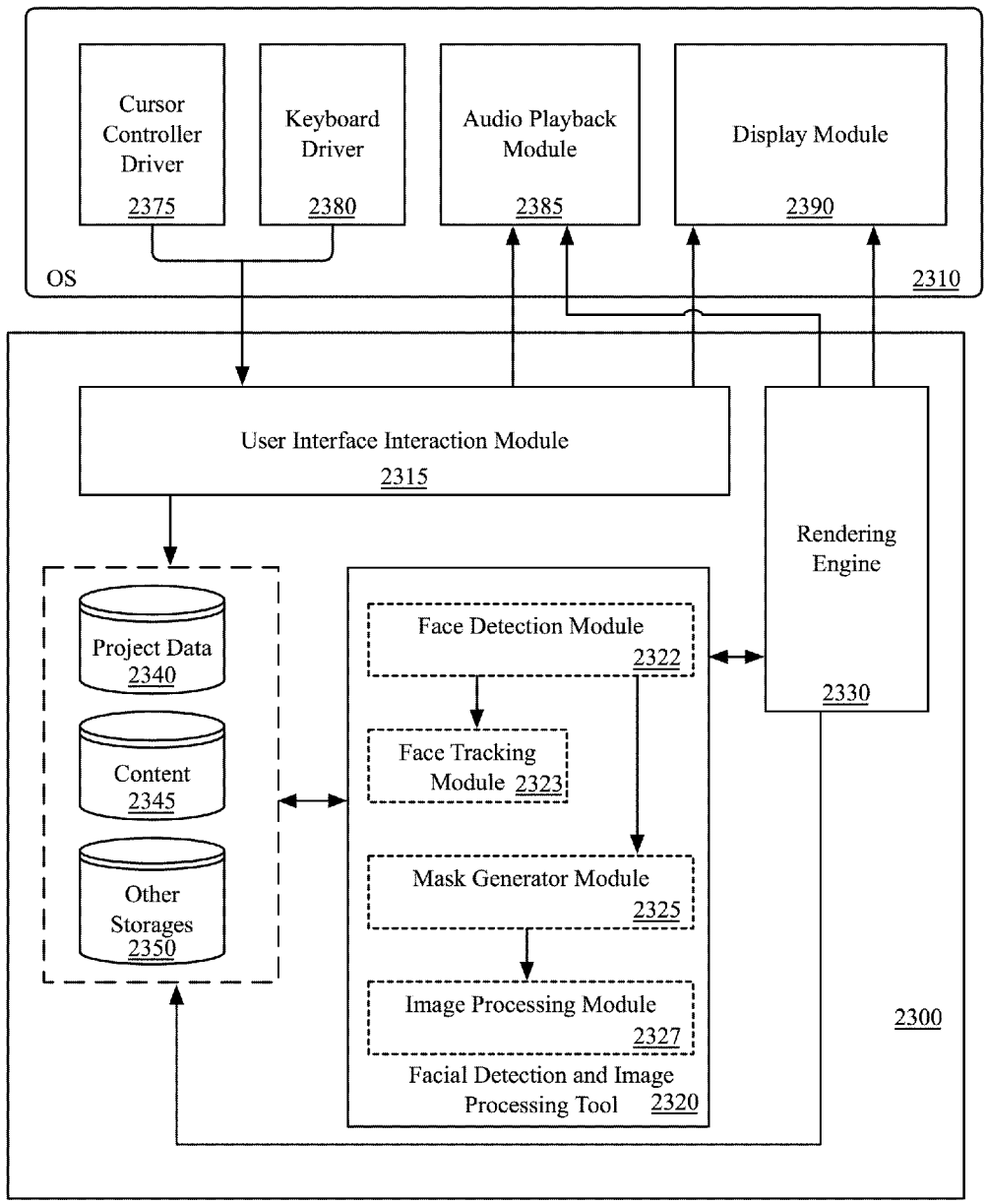
FIG. 23 conceptually illustrates the software architecture of an application of some embodiments for automatic face detection and image processing.

In some embodiments, the processes described above are implemented as software running on a particular machine, such as a computer or a handheld device, or stored in a computer readable medium. FIG. 23 conceptually illustrates the software architecture of an application 2300 of some embodiments for automatic face detection and image processing as those described in the preceding sections. In some embodiments, the application is a stand-alone application or is integrated into another application (for instance, application 2300 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

Media editing application 2300 includes a user interface interaction module 2315 for sending data to and receiving data from a user, a facial detection and image-processing tool 2320 for receiving and processing media clips from a composite project, a rendering engine 2330 used to generate image data for storage or display, and a set of storages 2340-2350 for storing data used by the application 2300. The set of storages includes storages for project data 2340, content data 2345, as well as other data 2350 (e.g., data about media objects in a video scene).

The operating system 2310 of some embodiments includes a cursor controller driver 2375 that allows the application 2300 to receive data from a cursor control device, a keyboard driver 2380 that allows the application 2300 to receive data from a keyboard, an audio playback module 2385 for processing audio data that will be supplied to an audio device (e.g., a soundcard and speakers), and a display module 2390 for processing video data that will be supplied to a display device (e.g., a monitor).

A user interacts with items in the user interface of the media editing application 2300 via input devices (not shown) such as a cursor controller (e.g., a mouse, touchpad, trackpad, etc.) and/or keyboard. The input from these devices is processed by the cursor controller driver 2375 and/or the keyboard driver 2380, and passed to the user interface interaction module 2315.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The UI interaction module 2315 interprets the user input data and passes it to the face detection and image-processing tool 2320. In some embodiments, the input data directly affects the project data or other data stored in the storages 2340, 2345 and 2350. For instance, when a user modifies a property of a composite presentation part (e.g., when applying a particular image processing operation to a composite presentation part), this is directly modified in the project data 2340 in some embodiments.

The UI interaction module 2315 also manages the display of the UI, and outputs display information to the display module 2390. This display information may be based on information from the storages (e.g., 2345), the various modules (e.g., face detection module 2322), or directly from input data (e.g., when a user moves an item in the UI that does not affect the presentation) in some embodiments.

The face detection and image-processing tool 2320 includes a face detection module 2322, a face tracking module 2323, a mask generator module tool 2325, and an image processing module 2327. The face detection and image-processing tool 2320 receives instructions and data from the UI interaction module to perform automatic face detection and image processing.

The face detection and image-processing tool 2320 of some embodiments processes instructions received from the user interface interaction module 2315 and data retrieved from the set of data storages 2340-2350. The face detection and image-processing tool 2320 can also create and/or update data stored within the set of data storages 2340-2350 based on received instructions that affect the project data 2340, content 2345, or other stored data 2350. Furthermore, the face detection and image-processing tool 2320 can also send data and/or instructions to the rendering engine 2330 of some embodiments. The face detection and image-processing tool 2320 can perform, for example, some or all of the operations of processes 600, 700, 900, 1200, 1300 and/or 1000 in some embodiments. The respective modules that make up the face detection and image-processing tool 2320 are further elaborated as follows.

The face detection module 2322 of some embodiments performs automatic face detection on media content (e.g., video content and/or picture content) to detect and/or identify faces and generate respective face parameters for the detected and/or identified faces. In some embodiments, the face detection module 2322 receives instructions from the UI interface interaction module to perform automatic face detection for media content stored in the content storage 2345. The instructions are received in some embodiments after the user interacts with a UI item within the UI for initiating the face detection. The face detection module 2322 can store the face parameters in the project data storage 2340 in some embodiments. In some embodiments, the face parameters includes information as described above in the example data structure shown in FIG. 22. Next, the face detection module 2322 can transmit the face parameters to the face tracking module and the mask generator module tool for processing.

The face tracking module 2323 of some embodiments tracks the detected and/or identified faces. In some embodiments, the face tracking module 2323 uses face parameters received from the face detection module 2322 to keep track of the detected faces in an image sequence. Alternatively, or conjunctively, the face tracking module 2323 may also utilize other face tracking techniques. For instance, the face tracking module 2323 of some embodiments apply the face tracking that uses intensity gradients and color histograms as described above.

The mask generator module 2325 of some embodiments generates mask data based on the face parameters. The mask generator module 2325 of some embodiments receives the face parameters from the face detection module 2322. In other embodiments, the mask generator module 2325 generates the mask data based on the face parameters stored in the project data storage 2340. The mask data of some embodiments includes information for the ellipse-shaped masks corresponding to a particular frame as described in earlier sections. For example, the mask data can include information for respective areas of the frame where the ellipse-shaped masks surround the locations of faces. The mask generator module 2325 then passes the mask data to the image processing module 2327 for processing.

The image processing module 2327 of some embodiments applies a set of image processing operations on the media content. In some embodiments, the set of image processing operations include one or more different types of image processing operations. This set of image processing operations can be received as instructions from the user interface interaction module 2315. The instructions are received in some embodiments after the user interacts with a respective set of UI items within the UI for specifying the set of image processing operations.

More specifically, the image processing module 2327 applies the set of image processing operations based on the mask data from the mask generator module 2325. For example, the image processing module 2327 applies the set of image processing operations based on areas of the frame defined by ellipse-shaped masks from the mask data. In some embodiments, the image processing modules then stores the modifications to the media content after performing image processing on content storage 2345.

Rendering engine 2330 enables the storage or output of audio and video from the media editing application 2300. For example, rendering engine 2330 uses data about media objects in a video scene to render the video scene from the particular location, direction, etc. defined by a camera object. As such, the rendering engine 2330 receives, in some embodiments, data from the facial detection and image-processing tool 2320 so that a preview can be displayed. Data from the rendering engine 2330 (e.g., audio and video data of a video scene, preview data, etc.) is passed to the display module 2390 and/or the audio playback module 2385. The audio playback module enables audio playback from the media editing application 2300 on an audio device (e.g., a set of speakers or headphones). Display module 2390 enables the display of the media editing application 2300 on a display device (e.g., a CRT monitor, LCD screen, etc.). Alternatively, data can be passed from the rendering engine 2330 to the set of storages 2340-2350 for later playback.

While many of the features have been described as being performed by one module (e.g., the UI interaction module 2315 or the rendering engine 2330), one of ordinary skill in the art would recognize that a particular operation might be split up into multiple modules, and the performance of one feature might even require multiple modules in some embodiments. For instance, in some embodiments, the facial detection module 2322 can be a separate module (or modules) from the face detection and image-processing tool 2320.

Furthermore, although the application 2300 and its features have been described using several specific embodiments, other embodiments might implement the application or its features using different resources or by placing the various modules in different specific locations. For instance, in some embodiments the application is a standalone application that includes all the functionality and data access needed to run the application on a particular user device.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
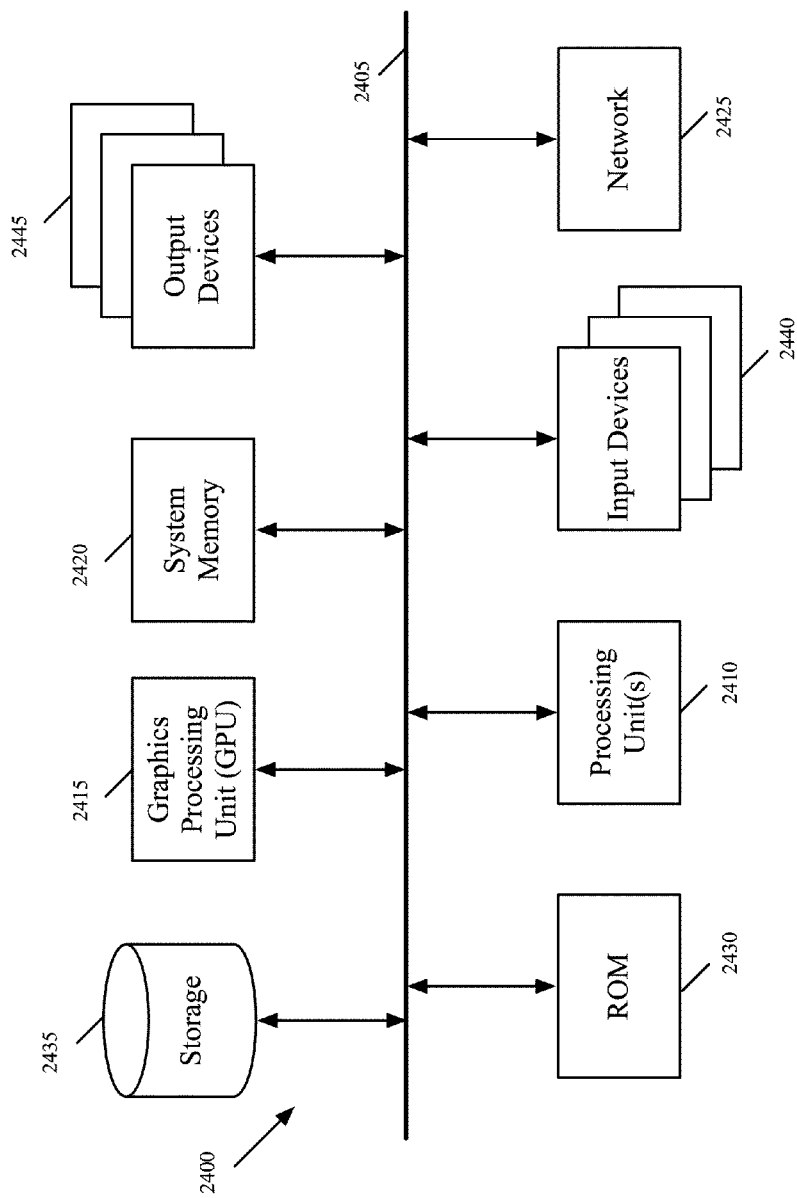
FIG. 24 conceptually illustrates an electronic system with which some embodiments are implemented.

FIG. 24 conceptually illustrates an electronic system 2400 with which some embodiments of the invention are implemented. The electronic system 2400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410. In some embodiments, such functionality can be provided using CoreImage's kernel shading language.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash memory device, etc., and its corresponding disk drive) as the permanent storage device. Like the permanent storage device 2435, the system memory 2420 is a read-and-write memory device. However, unlike storage device 2435, the system memory 2420 is a volatile read-and-write memory, such as random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"), cameras (e.g., webcams), microphones or similar devices for receiving voice commands, etc. The output devices 2445 display images generated by the electronic system or otherwise output data. The output devices 2445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 7, 9, 10, 11, 12, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A computer-implemented method of processing a video frame that is included in a particular media clip for a media-editing application, the method comprising:
   in a composite display area of the media-editing application, receiving a plurality of media clips to form a composite media presentation, the plurality of media clips including the particular media clip;
   identifying a set of faces in the video frame of the particular media clip;
   receiving a set of user defined image processing operations for applying to the set of faces;
   generating a set of geometric shapes enclosing the set of faces; and
   applying the set of image processing operations to respective areas of the video frame isolated by the set of geometric shapes, wherein applying the set of image processing operations results in modifying pixel values of the video frame.

2. The method of claim 1, wherein the set of faces are identified by using a face detection technique.

3. The method of claim 1, wherein the set of faces are identified by using a face recognition technique.

4. The method of claim 1, wherein a set of geometric dimensions of each of the geometric shapes is determined using face geometry data of a corresponding face.

5. The method of claim 1 further comprising applying a filtering-based processing operation to the respective areas of the video frame isolated by the set of geometric shapes.

6. The method of claim 1 further comprising applying a set of image processing operations to a portion of the video frame outside of the respective areas of the video frame isolated by the set of geometric shapes.

7. The method of claim 1, wherein the set of user defined image processing operations includes a color correction operation.

8. The method of claim 7, wherein the color correction operation changes an exposure value of the respective areas of the video frame isolated by the set of geometric shapes.

9. The method of claim 1, wherein the set of geometric shapes comprises a set of ellipse-shaped masks.

10. The method of claim 9 further comprising:
    generating an elliptical halo region around each ellipse of the set of ellipse-shaped masks.

11. The method of claim 10, wherein the elliptical halo region softens the image processing operations applied to the respective areas of the video frame isolated by the set of geometric shapes.

12. The method of claim 1 further comprising:
identifying the set of faces in a second video frame of the particular media clip; and
applying the set of user defined image processing operations to a set of geometric shapes enclosing the set of faces identified in the second video frame.

13. The method of claim 12, wherein the set of faces in the second frame are identified by tracking a change in a location of each face in the second video frame from a location of a corresponding face in the video frame.

14. The method of claim 12, wherein the set of faces in the second frame is identified by detecting a change in lighting conditions between the second video frame and the video frame.

15. The method of claim 1 further comprising:
generating a respective chroma key for each face of the set of faces; and
applying a color correction operation to the respective areas of the video frame isolated by a combination of the set of geometric shapes and each respective chroma key.

16. The method of claim 15, wherein each chroma key is generated by sampling a set of pixels at a respective geometric shape enclosing each face.

17. A non-transitory computer readable storage medium including a computer program, the computer program including instructions for providing a graphical user interface (GUI) for automatically applying a set of image processing operations to a video frame, the GUI comprising:
a first user interface item for detecting a set of faces in the video frame;
a second user interface item associated with each face of the set of faces detected in the video frame;
a third user interface item for representing each of a set of image properties for the set of faces, said third user interface item adjustable based on user-input; and
a selectable fourth user interface item for generating a set of ellipses enclosing a set of locations respectively associated with the set of faces in the video frame, and modifying a set of areas enclosed by the set of ellipses according to a set of image parameters represented by the third user interface item.

18. The non-transitory computer readable storage medium of claim 17, wherein the set of image parameters includes at least one of exposure, contrast, temperature, saturation, and brightness.

19. The non-transitory computer readable storage medium of claim 17, wherein the computer program is a media-editing application.

20. The non-transitory computer readable storage medium of claim 17, wherein the video frame is included in a media clip.

21. An apparatus for automatically applying a set of image processing operations to a video frame in an image sequence comprising a plurality of video frames, the apparatus comprising:
a face detection module for identifying a set of faces in the video frame;
a mask generation module for generating a set of geometric shapes enclosing the set of faces;
an image processing module for applying the set of image processing operations to areas enclosed by the set of geometric shapes in the video frame; and
a storage for storing face data for each face of the set of faces, the face data comprising a name and respective geometry data associated with each face.

22. The apparatus of claim 21, wherein the face data further comprises:
respective location data of each face of the set of faces, and respective timecode data for each face of the set of faces.

23. The apparatus of claim 21 further comprising a face tracking module for tracking the set of faces in other video frames of the image sequence.

24. The apparatus of claim 21, wherein the set of geometric shapes includes a set of ellipses.

25. The apparatus of claim 24, wherein the mask generator module generates elliptical halo regions for respective edges of the set of ellipses.

26. A computer-implemented method for processing an image sequence comprising a plurality of images, the method comprising:
identifying a set of respective locations of a set of faces in the plurality of images of the image sequence;
receiving a selection of a subset of faces from the set of faces;
generating a set of geometric shapes enclosing the respective locations of the selected faces in the subset by tracking each selected face through the plurality of images; and
applying a set of image processing operations to respective areas within images isolated by the set of geometric shapes, wherein applying image processing operations results in modifying pixel values of the images.

27. The method of claim 26, wherein the set of faces is identified by using a face detection technique.

28. The method of claim 26, wherein each selected face is tracked by using a face recognition technique.

29. The method of claim 26 further comprising:
automatically selecting the image processing operations to apply.

30. The method of claim 26 further comprising:
receiving from a user a selection of the image processing operations to apply.

31. The method of claim 26 further comprising:
applying a second set of image processing operations to portions of images outside of the respective areas isolated by the set of geometric shapes wherein the second set of image processing operations modifies pixel values of the images differently from the set of image processing operations.

32. The method of claim 26, wherein the set of image processing operations includes one image processing operation.

33. The method of claim 26, wherein the set of image processing operations includes two or more image processing operations.

34. The method of claim 26, wherein the tracking of each selected face comprises:
generating face parameters for the face in the subset; and
tracking the face using the generated face parameters over video frames of the plurality of images of the image sequence.

35. The method of claim 34, wherein the face parameters comprise size, shape, orientation, location, locations of features, and feature vector of the face.

* * * * *